United States Patent
Akdeniz et al.

(10) Patent No.: US 12,231,490 B2
(45) Date of Patent: Feb. 18, 2025

(54) USES OF CODED DATA AT MULTI-ACCESS EDGE COMPUTING SERVER

(71) Applicant: Intel Corporation, Santa Clara, CA (US)

(72) Inventors: Mustafa Riza Akdeniz, San Jose, CA (US); Arjun Anand, Milpitas, CA (US); Ravikumar Balakrishnan, Beaverton, OR (US); Sagar Dhakal, Los Altos, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/550,856

(22) PCT Filed: Jun. 9, 2022

(86) PCT No.: PCT/US2022/032873
§ 371 (c)(1),
(2) Date: Sep. 15, 2023

(87) PCT Pub. No.: WO2022/261353
PCT Pub. Date: Dec. 15, 2022

(65) Prior Publication Data
US 2024/0155025 A1 May 9, 2024

Related U.S. Application Data

(60) Provisional application No. 63/208,831, filed on Jun. 9, 2021.

(51) Int. Cl.
*G06F 13/00* (2006.01)
*G06N 3/098* (2023.01)
(Continued)

(52) U.S. Cl.
CPC ............. *H04L 67/10* (2013.01); *G06N 3/098* (2023.01); *H04L 67/289* (2013.01)

(58) Field of Classification Search
CPC ....... H04L 67/10; H04L 67/289; H04L 67/12; H04L 69/14; H04L 67/52; H04L 67/566; G06N 3/098; G06N 3/084; G06N 3/0985
(Continued)

(56) References Cited

U.S. PATENT DOCUMENTS 10,657,461 B2 * 5/2020 McMahan ............... G06N 3/098
2019/0340534 A1 11/2019 McMahan et al.
(Continued)

FOREIGN PATENT DOCUMENTS

WO 2020226979 12/2020

OTHER PUBLICATIONS

Anand, Arjun, et al.; "Differentially Private Coded Federated Linear Regression," 2021 IEEE Data Science and Learning Workshop (DSLW); Jun. 2021; 11 pages.
(Continued)

*Primary Examiner* — Kenneth R Coulter
(74) *Attorney, Agent, or Firm* — Alliance IP, LLC

(57) ABSTRACT

An apparatus of an edge computing node, a method, and a machine-readable storage medium. The apparatus is to decode messages from a plurality of clients within the edge computing network, the messages including respective coded data for respective ones of the plurality of clients; computing estimates of metrics related to a global model for federated learning using the coded data, the metrics including a gradient on the coded data; use the metrics to update the global model to generate an updated global model, wherein the edge computing node is to update the global model by calculating the gradient on the coded data based on a linear fit of the global model to estimated labels from the
(Continued)

federated learning; and send a message including the updated global model for transmission to at least some of the clients.

25 Claims, 16 Drawing Sheets

(51) Int. Cl.
  *H04L 67/10* (2022.01)
  *H04L 67/289* (2022.01)
(58) Field of Classification Search
  USPC ......... 709/201, 204, 205; 706/10, 17, 21, 15
  See application file for complete search history.

(56) References Cited

U.S. PATENT DOCUMENTS

2022/0116764 A1* 4/2022 Pezeshki ............... H04W 72/20
2022/0383204 A1* 12/2022 Thakkar ................ G06N 20/20

OTHER PUBLICATIONS

Balakrishnan, Ravikumar, et al.; "Resource Management and Model Personalization for Federated Learning over Wireless Edge Networks," Journal of Sensor and Actuator Networks, vol. 10, No. 1; Feb. 2021; 12 pages.
Dhakal, Sagar, et al.; "Coded Federated Learning," arXiv:2002.09574v1; Feb. 2020; 6 pages.
PCT International Search Report and Written Opinion issued in PCT/US2022/032873, dated Sep. 27, 2022; 11 pages.

* cited by examiner

USES OF CODED DATA AT MULTI-ACCESS EDGE COMPUTING SERVER

CROSS-REFERENCE TO RELATED APPLICATION

This application is a national phase filing under 35 U.S.C. § 371 of International Application No. PCT/US2022/032873, filed Jun. 9, 2022 and titled "USES OF CODED DATA AT MULTI-ACCESS EDGE COMPUTING SERVER.", which application claims the benefit of, and priority from, U.S. Provisional Patent Application Ser. No. 63/208,831, filed Jun. 9, 2021, entitled "USES OF CODED DATA AT MULTI-ACCESS EDGE COMPUTING SERVER." The disclosure of the prior application is considered a part of and is incorporated by reference in its entirety in the disclosure of this application.

FIELD

The instant disclosure relates to coded federated learning in an edge cloud environment.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications, coordinated service instances and machine learning, such as federated machine learning, among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Mechanisms are needed to address the challenges of developing globally accurate learning models over wireless edge networks with distributed data, and online, distributed algorithms deployed in real-time and using compute, communication and data resources that are heterogenous, mobile and that change dynamically.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments will focus on learning that is collaborative, hierarchical, and that uses distributed datasets/datapoints and processing while aiming to preserve privacy. Some embodiments advantageously draw on opportunities provided by resource rich, real-time compute environments offered by wireless edge networks to exploit compute and communication resources, to lower latency and communication costs, to increase privacy (for example by transferring results instead of raw data), to automate and scale ML training, and to promote multi-stage learning.

Sections A through G. below will provide an overview of configurations for edge computing, such as wireless edge computing, including, respectively, overviews of edge computing, usage of containers in edge computing, mobility and multi-access edge computing (MEC) in edge computing settings, computing architectures and systems, machine readable medium and distributed software instructions, a satellite edge connectivity use case, software distribution in edge computing settings. Section H. provides an overview of machine learning in edge computing networks.

Sections H through P provide a detailed description of some respective demonstrative embodiments that address challenges of developing globally accurate learning models over wireless edge networks with distributed data. Aspects of embodiments described in any one of Sections H. through P. may be combined with other aspects described in any one of the same Sections as would be recognized by one skilled in the art. Embodiments of Sections H through P may be deployed or implemented using any of the configurations or environments described in any of Sections A through G described below.

A. Overviews of Edge Computing

Figure 1:
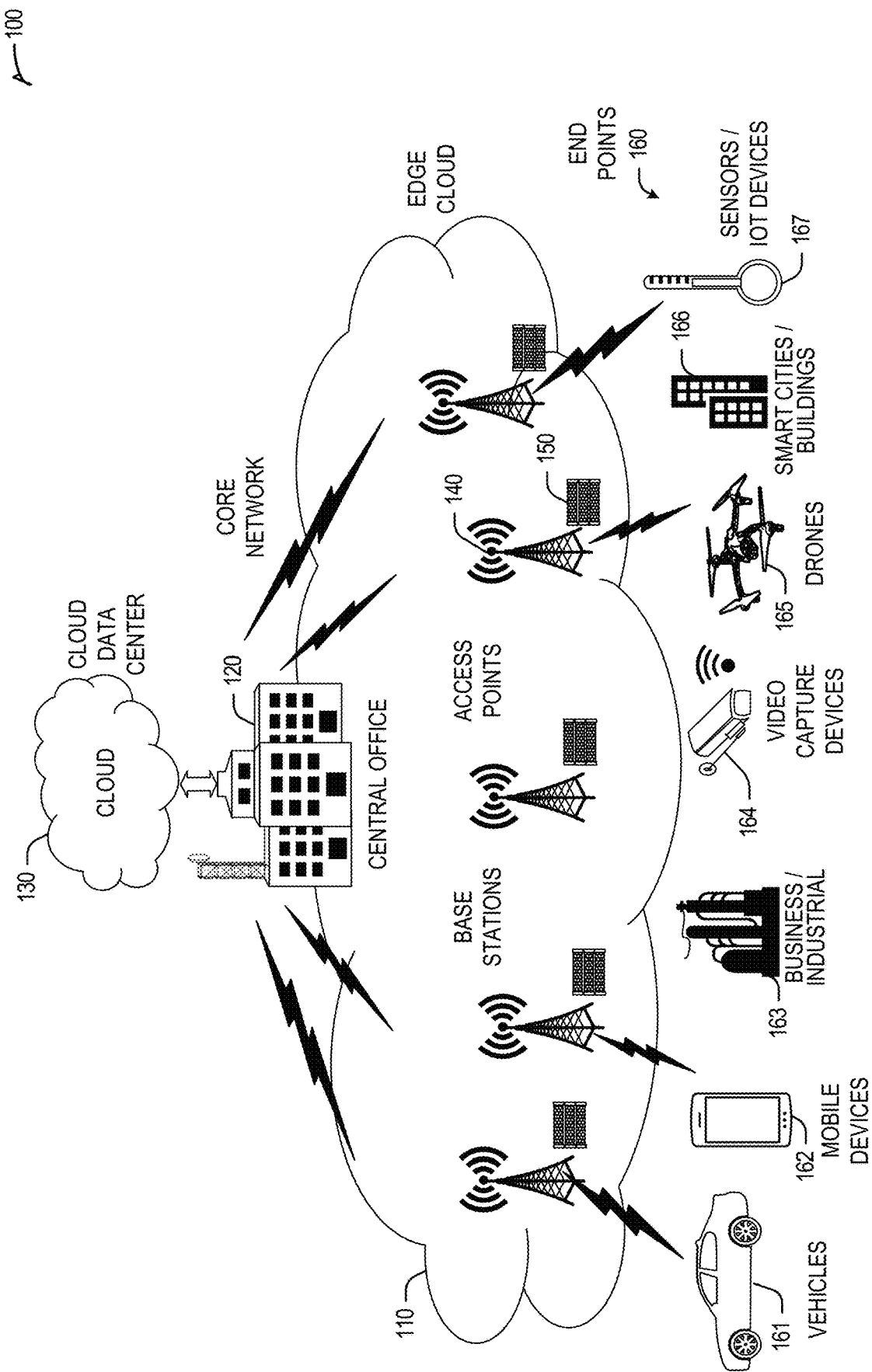
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power might be constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, which may use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
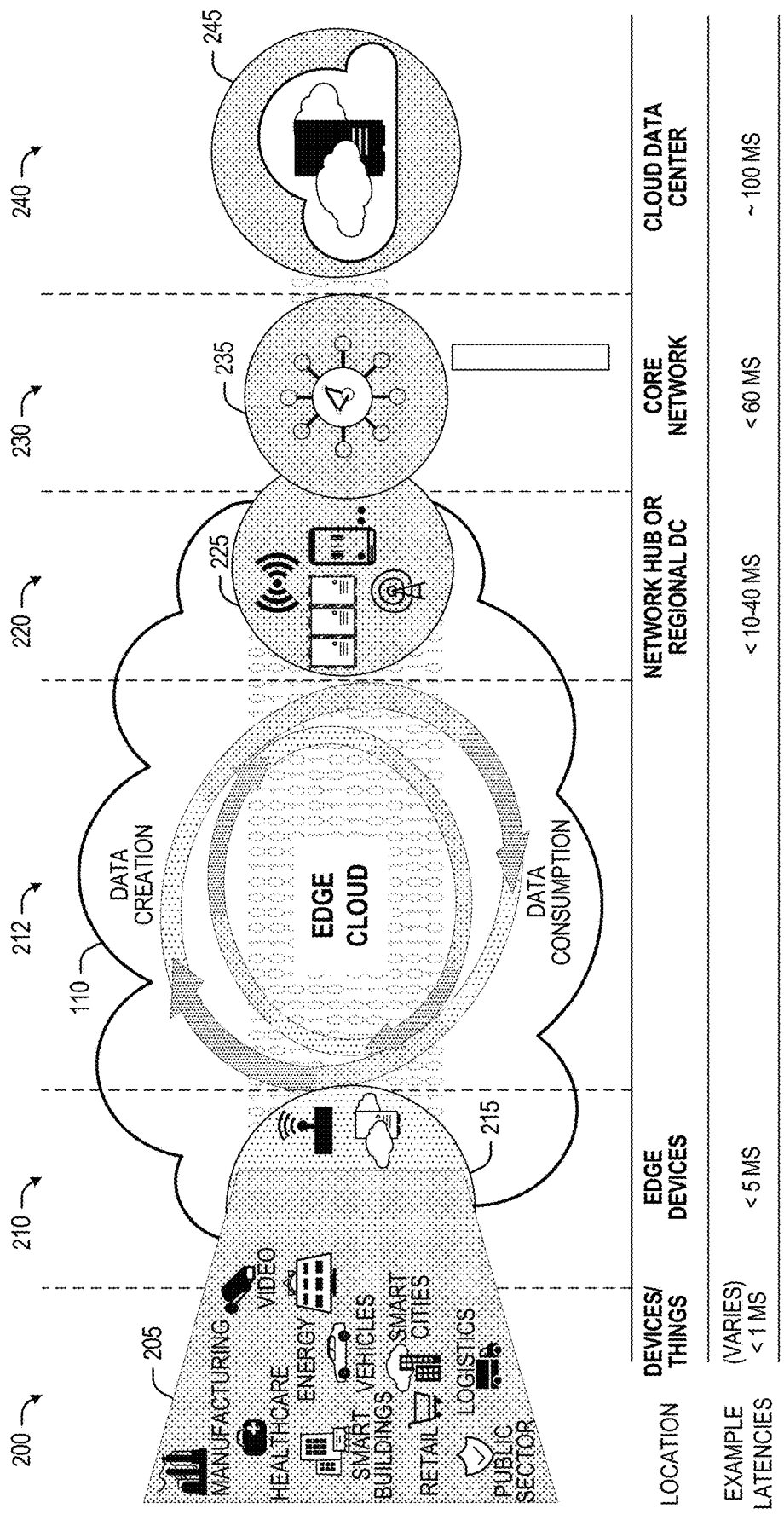
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge may be resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge computing nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc., which may be compatible with Open RAN (O-RAN) specifications promulgated by the O-RAN Alliance), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, sleds, etc.). A server rack may refer to a structure that is designed specifically to house technical equipment including routers, switches, hubs, servers (including CPU and/or GPU-based compute devices), data storage devices (e.g., storage area network (SAN) devices), or other types of computing or networking devices. The rack may make it possible to securely hold multiple pieces of equipment in one area. In some cases, the rack may include one or more sleds. A sled may refer to a housing that allows for a number of various compute, GPU, and/or storage devices to be housed in a position of a rack (e.g., a 4 unit (4U)-sized or other-sized unit). The sled may allow for the devices housed within it to be hot-swappable in some instances. Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
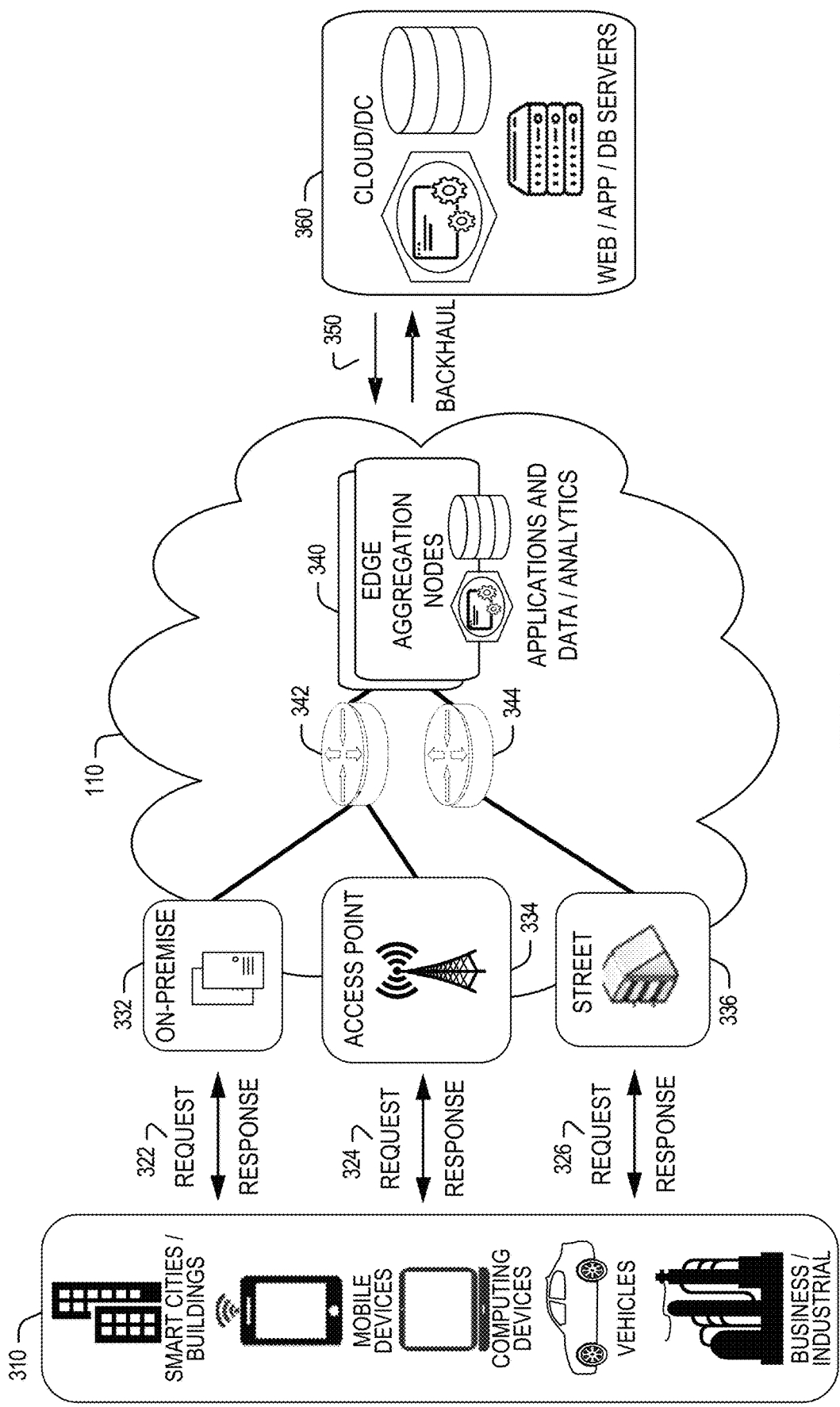
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

B. Usage of Containers in Edge Computing

Figure 4:
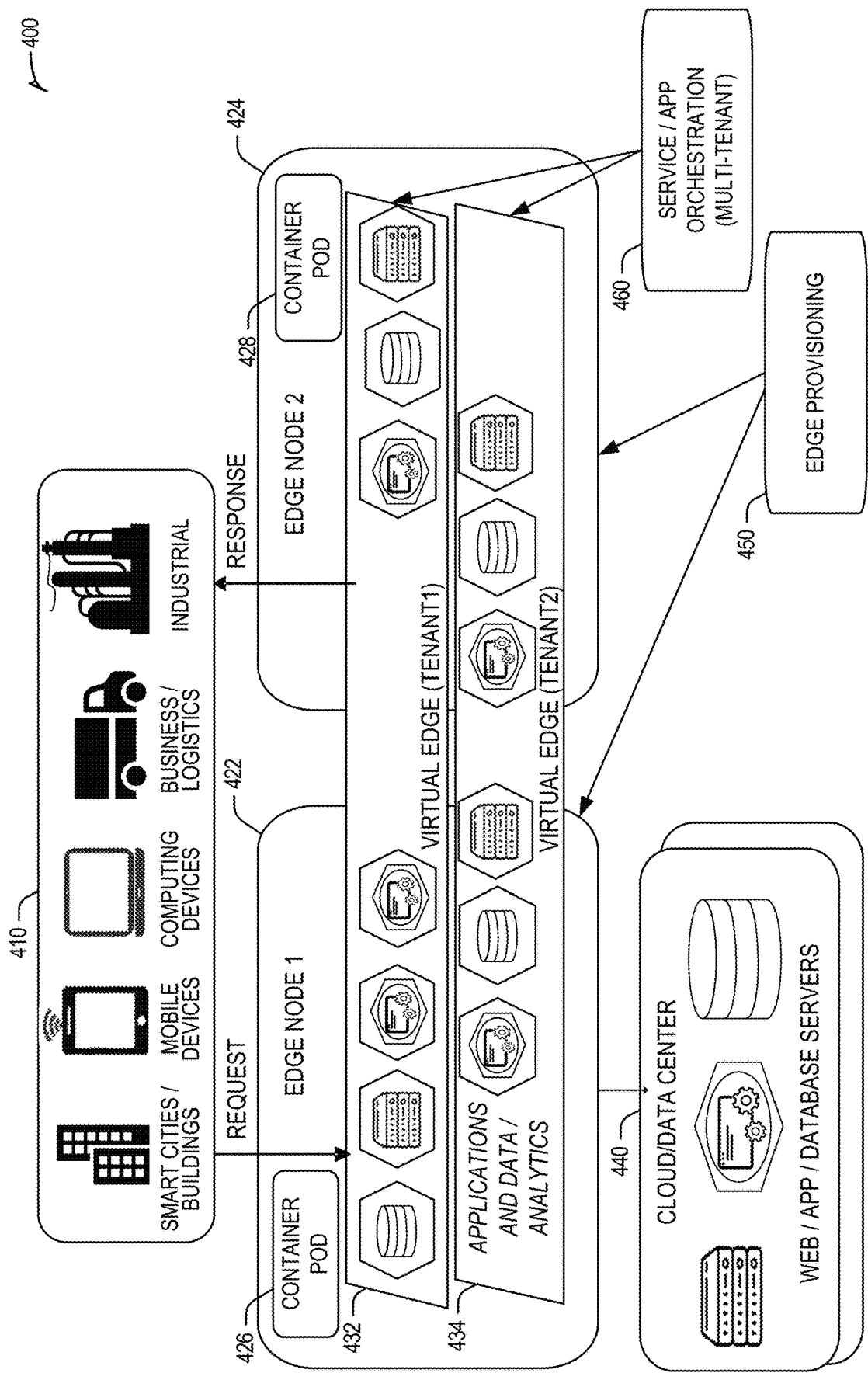
FIG. 4 illustrates deployment of a virtual edge configuration in an edge computing system operated among multiple edge nodes and multiple tenants.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes may use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid potential resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 5:
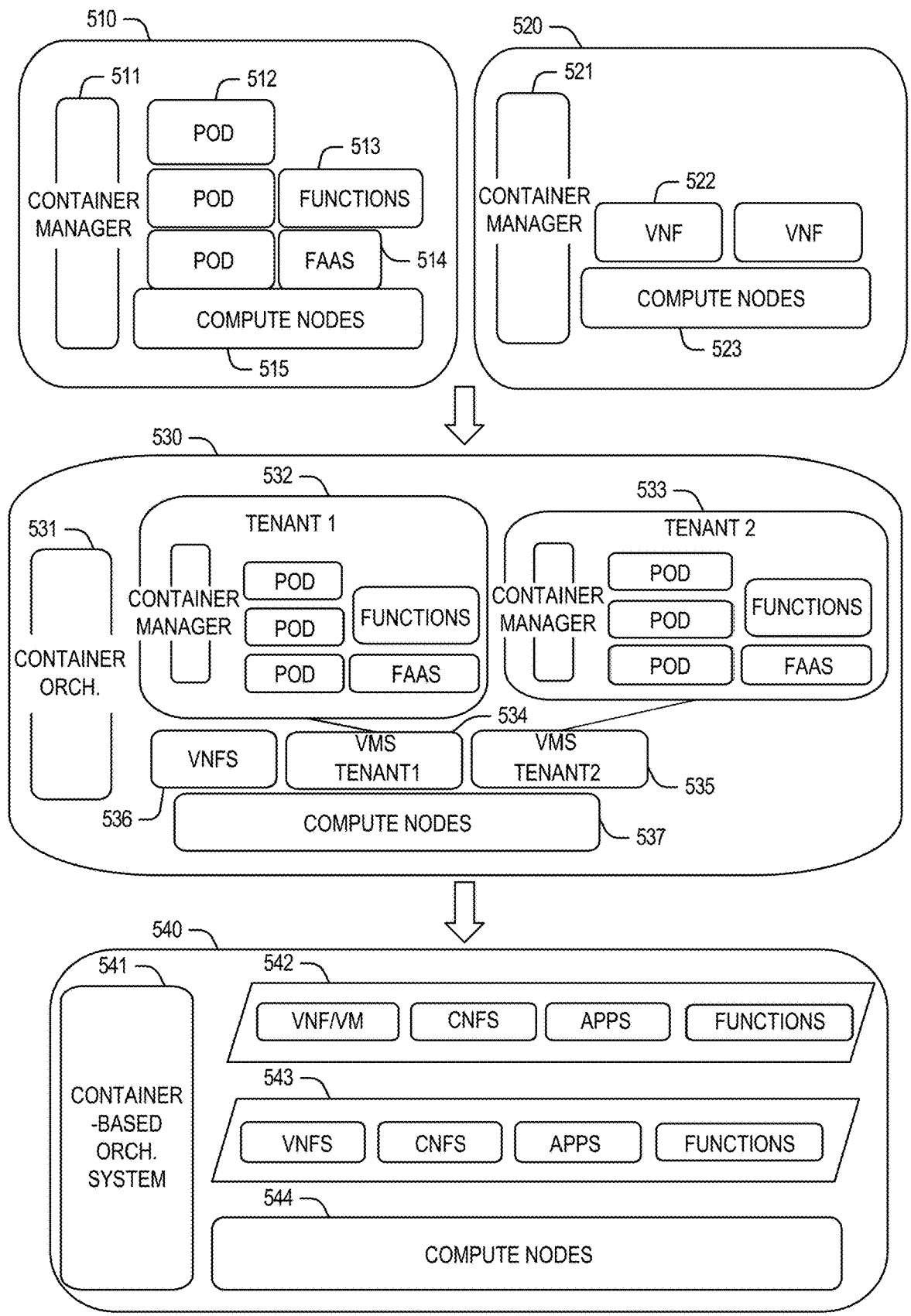
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via computing nodes (515 in arrangement 510), or to separately execute containerized virtualized network functions through execution via computing nodes (523 in arrangement 520). This arrangement is adapted for use of multiple tenants in system arrangement 530 (using computing nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on computing nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

C. Mobility and Multi-Access Edge Computing (MEC) in Edge Computing Settings

Figure 6:
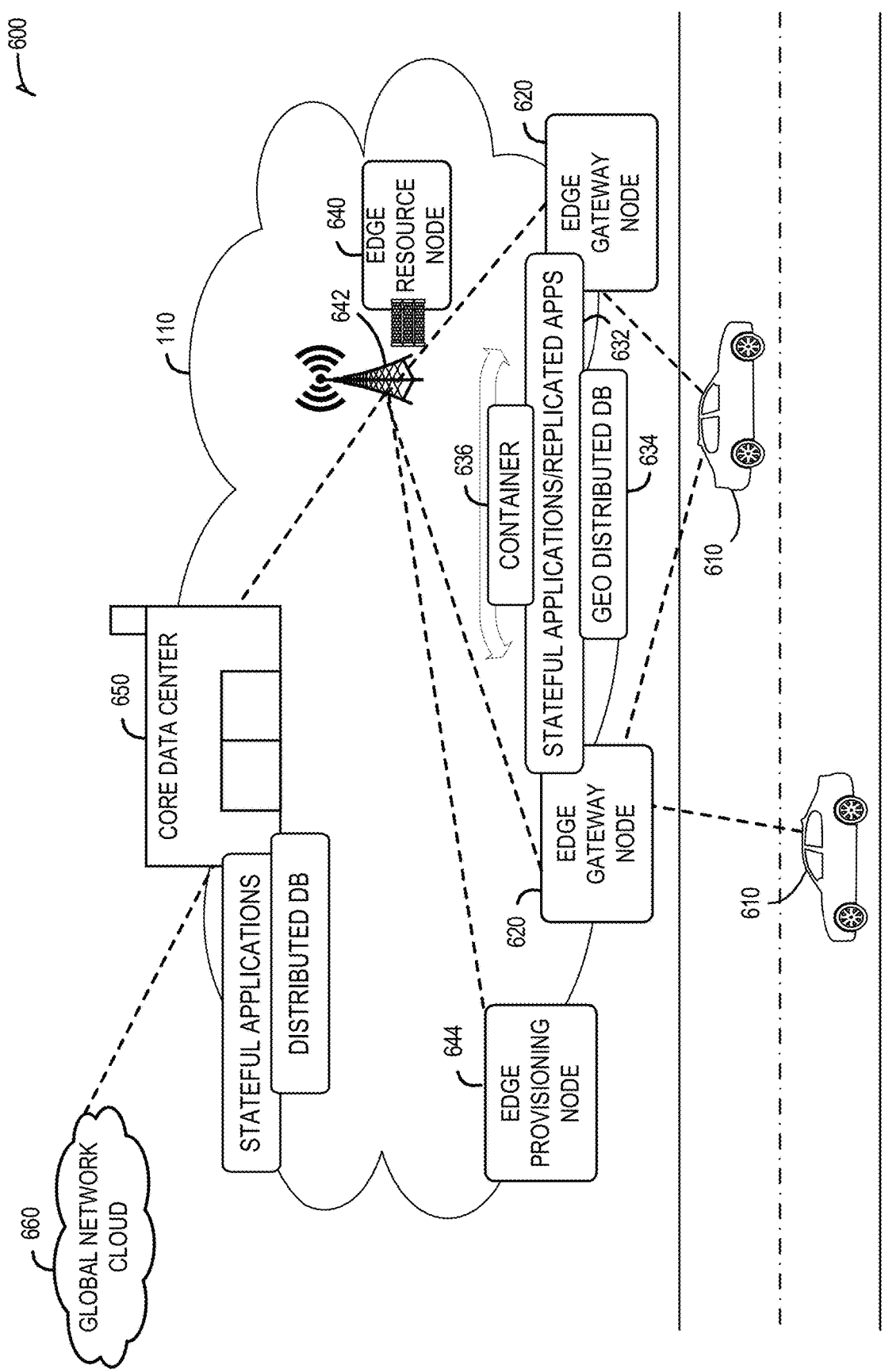
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client computing nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client computing node 610 and a particular edge gateway device 620 may propagate so as to maintain a consistent connection and context for the client computing node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client computing nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client computing nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client computing node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8, may be downloaded to the example processor platform/s, which is to execute the computer readable instructions 882 to implement the methods described herein.

In some examples, the one or more processors platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
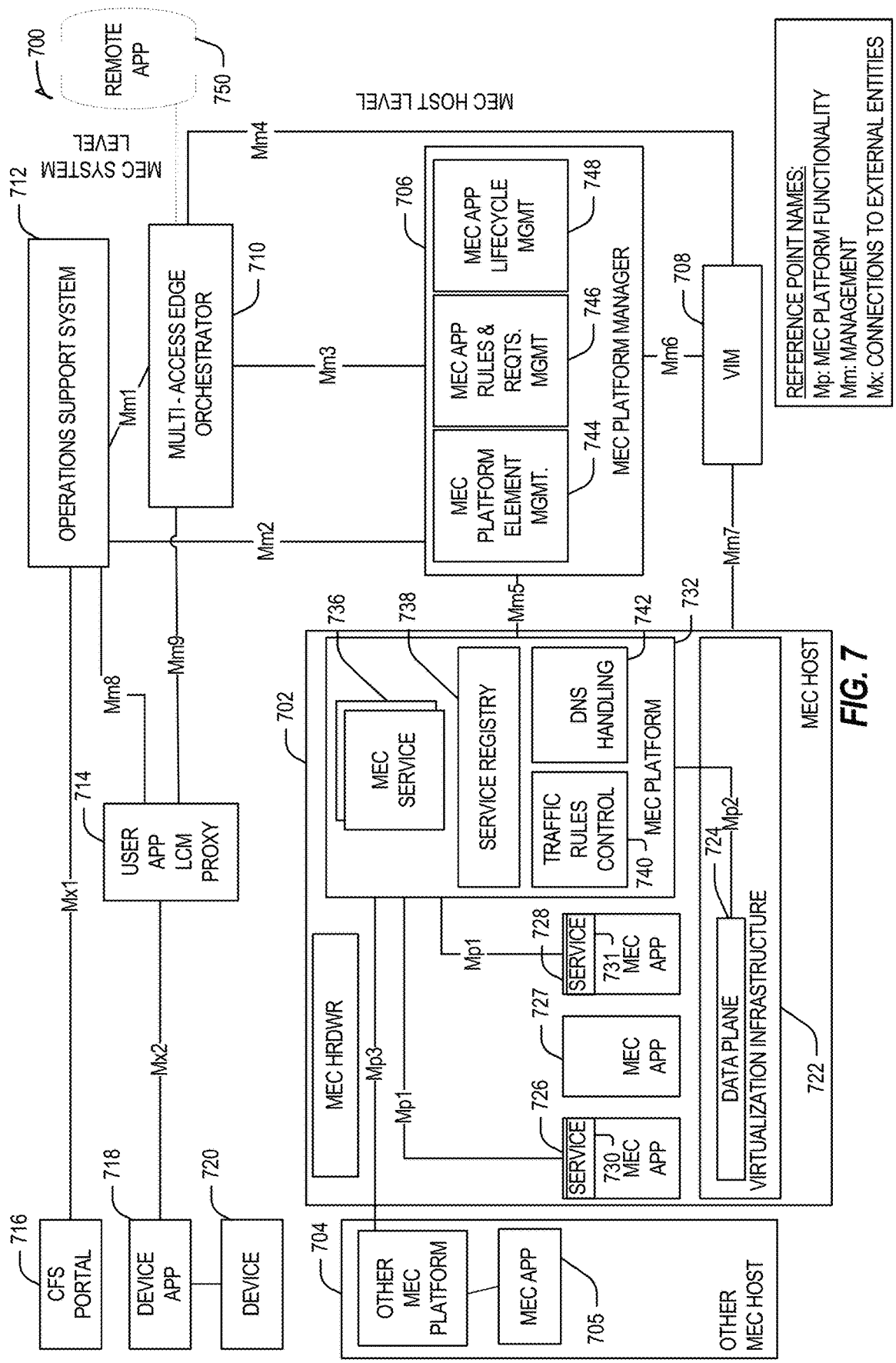
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN (e.g., O-RAN) or telecom-core network entities). The MEC app 705 instantiated within MEC host 704 can be similar to the MEC apps 726-7728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification.

In some aspects, the remote application (or app) 750 is configured to communicate with the MEC host 702 (e.g., with the MEC apps 726-7728) via the MEC orchestrator 710 and the MEC platform manager 706.

D. Computing Architectures and Systems

In further examples, any of the computing nodes or devices discussed with reference to the present edge computing systems and environment may be fulfilled based on the components depicted in FIG. 8. Respective edge computing nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8:
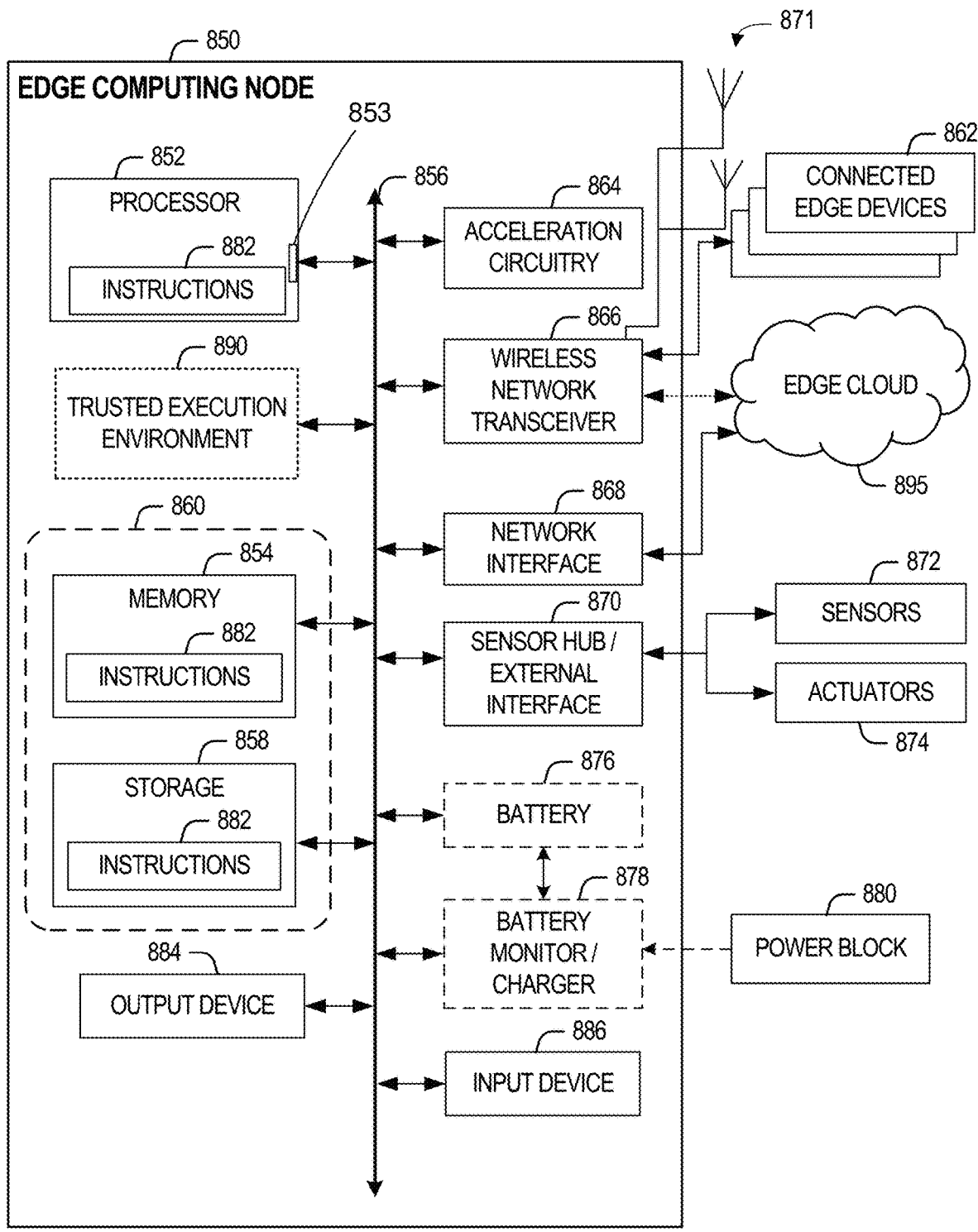
FIG. 8 provides a further overview of example components within a computing device in an edge computing system.

In a more detailed example, FIG. 8 illustrates a block diagram of an example of components that may be present in an edge computing node 850 for implementing the techniques (e.g., operations, processes, methods, and methodologies) described herein. The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8.

The processor 852 may communicate with a system memory 854 over an interconnect 856 (e.g., a bus) through an interconnect interface 853 of the processor. The interconnect interface 853 may include any input/output connection of the processor 852 that allows the processor 852 to be connected through interconnect 856 to other components of the edge computing node 850. The processor 852 may include one or more processors and/or any type of processing circuitry. Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may be coupled to one or more antennas 871 of the edge computing node 850 to enable the edge computing node to wirelessly communicate with other edge computing nodes or other nodes in the wireless edge network. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LT7990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

E. Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
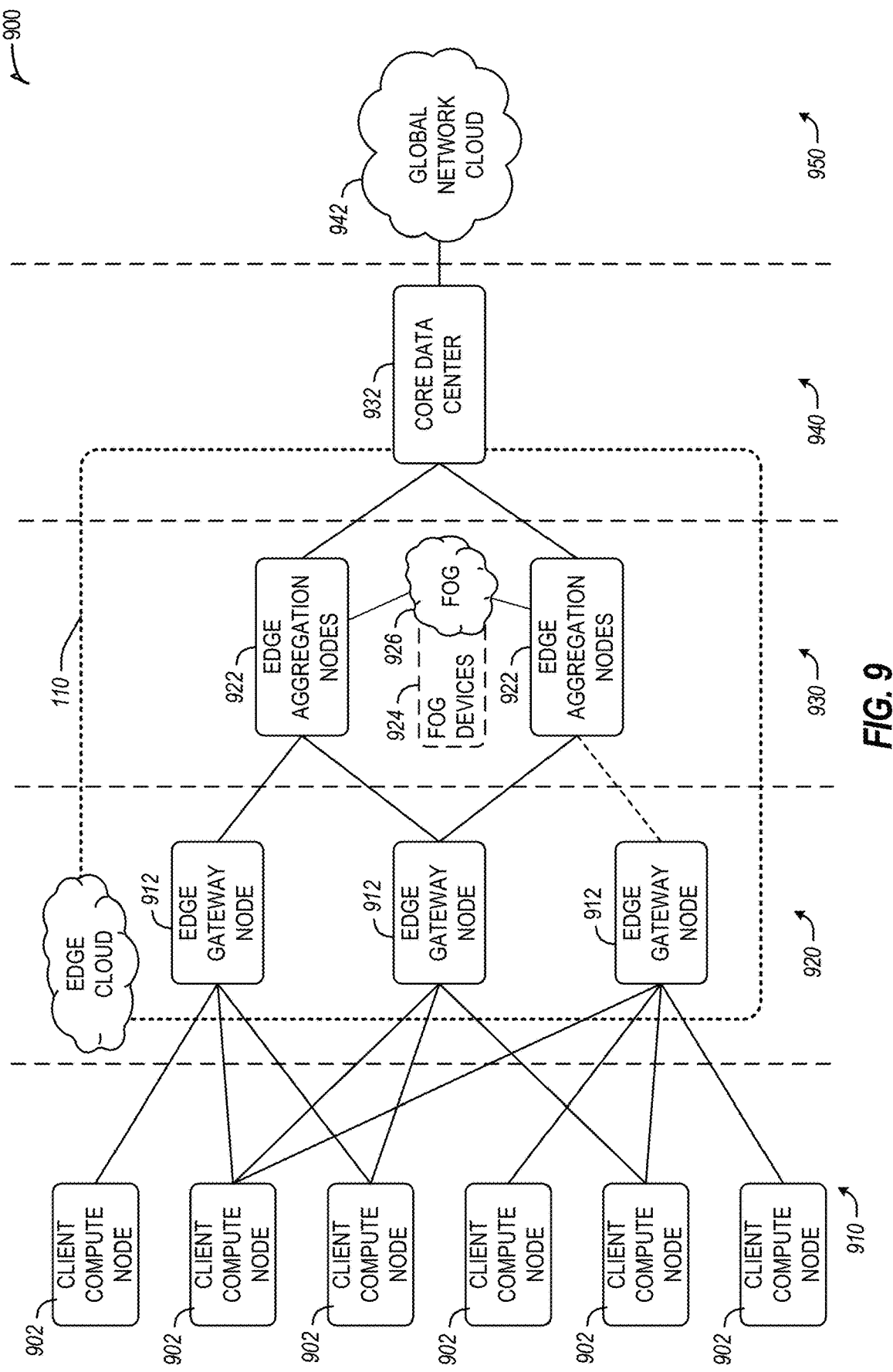
FIG. 9 illustrates an overview of layers of distributed compute deployed among an edge computing system, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client computing nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client computing nodes 902 are each located at an endpoint layer 910, while each of the edge gateway nodes 912 are located at an edge devices layer 920 (local level) of the edge computing system. Additionally, each of the edge aggregation nodes 922 (and/or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (e.g., a regional or geographically-central level), while the global network cloud 942 is located at a cloud data center layer 950 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 932 may be located within, at, or near the edge cloud 110.

Although an illustrative number of client computing nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client computing nodes 902, and one edge aggregation node 922 may service multiple edge gateway nodes 912.

Consistent with the examples provided herein, each client computing node 902 may be embodied as any type of end point component, device, appliance, or "thing" capable of communicating as a producer or consumer of data. Further, the label "node" or "device" as used in the edge computing system 900 does not necessarily mean that such node or device operates in a client or agent/minion/follower role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 9 as the client computing nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the cloud data center layer 950 and the client endpoints (e.g., client computing nodes 902). Some of these are discussed in the following sections in the context of network functions or service virtualization, including the use of virtual edges and virtual services which are orchestrated for multiple stakeholders.

The edge gateway nodes 912 and the edge aggregation nodes 922 cooperate to provide various edge services and security to the client computing nodes 902. Furthermore, because each client computing node 902 may be stationary or mobile, each edge gateway node 912 may cooperate with other edge gateway devices to propagate presently provided edge services and security as the corresponding client computing node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

F. Use Case: Satellite Edge Connectivity

Figure 10:
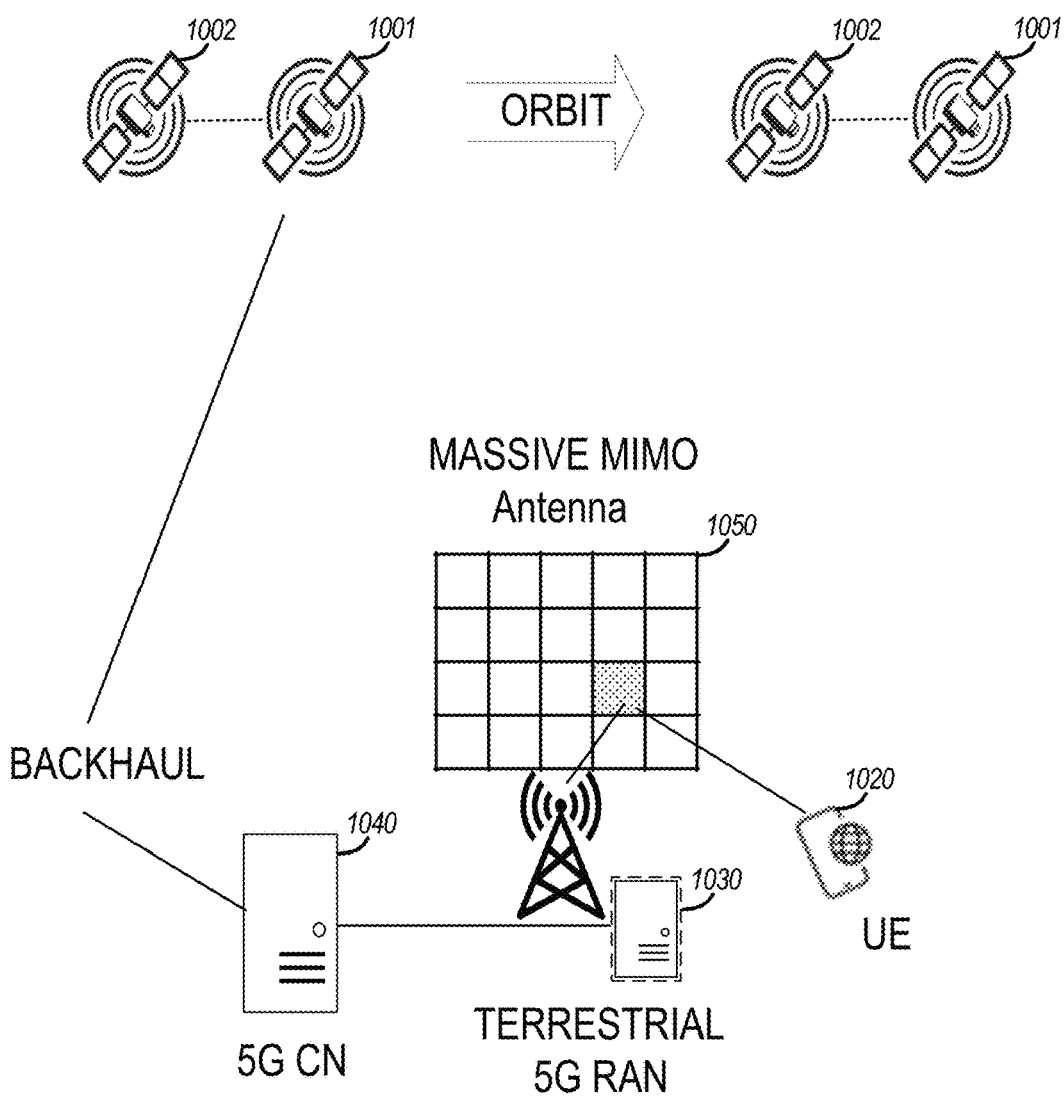
FIG. 10 illustrates network connectivity in non-terrestrial (satellite) and terrestrial (mobile cellular network) settings, according to an example.

FIG. 10 illustrates network connectivity in non-terrestrial (satellite) and terrestrial (mobile cellular network) settings, according to an example. As shown, a satellite constellation may include multiple satellites 1001, 1002, which are connected to each other and to one or more terrestrial networks. Specifically, the satellite constellation is connected to a backhaul network, which is in turn connected to a 5G core network 1040. The 5G core network is used to support 5G communication operations at the satellite network and at a terrestrial 5G radio access network (RAN) 1030. The RAN may be compatible with O-RAN specifications, in certain embodiments.

FIG. 10 also depicts the use of the terrestrial 5G RAN 1030, to provide radio connectivity to a user equipment (UE) 1020 via a massive MIMO antenna 1050. It will be understood that a variety of network communication components and units are not depicted in FIG. 10 for purposes of simplicity. With these basic entities in mind, the following techniques describe ways in which terrestrial and satellite networks can be extended for various edge computing scenarios.

G. Software Distribution

Figure 11:
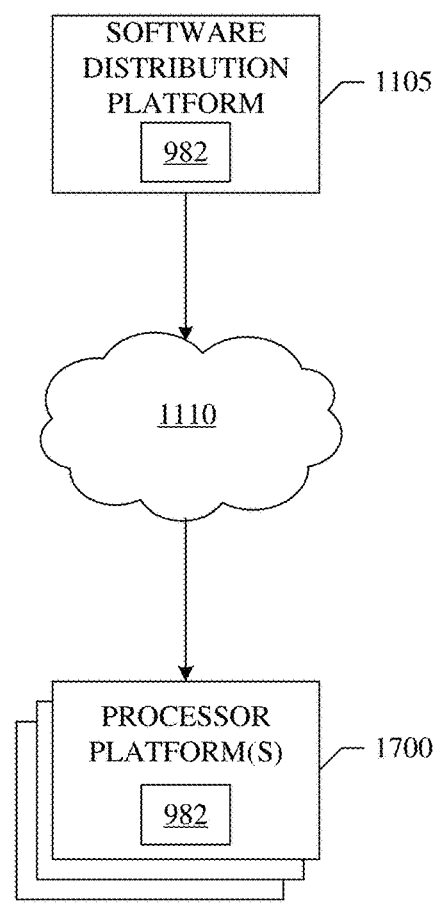
FIG. 11 illustrates an example software distribution platform to distribute software, such as the example computer readable instructions FIG. 8, to one or more devices.

FIG. 11 illustrates an example software distribution platform 1105 to distribute software, such as the example computer readable instructions 882 of FIG. 8, to one or more devices, such as example processor platform(s) 1100 and/or example connected edge devices 862. The example software distribution platform 1105 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 882. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1105. For example, the software, which may correspond to the example computer readable instructions 882 of FIG. 8, may be downloaded to the example processor platform(s) 1100 (e.g., example connected edge devices), which is/are to execute the computer readable instructions 882 to implement the software instructions. In some examples, one or more servers of the software distribution platform 1105 are communicatively connected to one or more security domains and/or security devices through which requests and transmissions of the example computer readable instructions 882 must pass. In some examples, one or more servers of the software distribution platform 1105 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 11, the computer readable instructions 882 are stored on storage devices of the software distribution platform 1105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 882 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

H. Machine Learning in Edge Computing Networks

Machine learning (ML) involves computer systems using algorithms and/or statistical models to perform specific task(s) without using explicit instructions, but instead relying on patterns and inferences. ML algorithms build mathematical model(s) (referred to as "ML models" or the like) based on sample data (referred to as "training data" or the like) in order to make predictions or decisions without being explicitly programmed to perform such tasks. ML algorithms perform a training process on a relatively large dataset to estimate an underlying ML model. Generally, an ML algorithm may refer to a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. In some cases, an ML model may include an artificial neural network (NN), which is based on a collection of connected nodes ("neurons") and each connection ("edges") transmit information (a "signal") from one node to other nodes. A neuron that receives a signal processes the signal using an activation function and then signals other neurons based on the processing. Neurons and edges typically have weights that adjust as learning proceeds. The weights may increase or decrease the strength of a signal at a connection.

Linear regression is one type of supervised ML algorithm that is used for classification, stock market analysis, weather prediction, and the like. Gradient descent (GD) algorithms may be used in linear regression. Given a function defined by a set of parameters, a GD algorithm starts with an initial set of parameter values, and iteratively moves toward a set of parameter values that minimize the function. This iterative minimization is achieved by taking steps in the negative direction of the function gradient. In some GD implementations, a model is updated iteratively, where multiplication of large matrices and vectors is performed in each epoch. An epoch may refer to a round of machine learning that is performed in the iterative process of updating a model. Since the training phase for GD algorithms may involve a large amount of iterative computations, running GD algorithms can be computationally intensive. Additionally, computation time bottlenecks rapidly as the model order grows in size.

Distributed computing has been used to reduce training time by offloading GD computations to multiple secondary computing nodes. However, distributing GD computations to heterogeneous computing environments, such as those comprising multiple client or edge devices is difficult because, in most cases, the available edge devices have different configurations, capabilities, and operate under different conditions. Additionally, many of the edge devices communicate using wireless links, which have lower reliability (i.e., in terms of link quality and achievable data rates) when compared to wired links used in server farms. The heterogeneous nature of these computing environments may result in longer lag times at each round of training (or "epoch") due to slower computing devices and/or computing devices with low quality radio links. For these reasons, the conventional distributed ML training approach cannot be straightforwardly applied to heterogeneous computing environments. Recently, federated learning has been proposed for distributed GD computation, where learning takes place by a federation of client computing nodes (which may also be referred to herein as "client devices") that are coordinated by a central server (which may be referred to herein as a MEC server or controller node).

Federated learning, where a global model is trained with coordination with a federation of client computing nodes/client nodes/clients while keeping the training data local at the clients is one of the problems under consideration herein. The federated learning protocol iteratively allows clients to download a centrally trained artificial intelligence/machine-learning model (or model) from a server, such as a MEC server, an edge server or a cloud server, update it with their own data and upload the model updates (such as a gradient update) back to the server. The model updates may include updates weight values for nodes of the NN model, for instance. The server then aggregates updates from multiple clients to update the global model. Federated learning over wireless edge networks is highly desired since data can be maintained local at the clients while the edge server can utilize the compute capabilities of clients to speed up training.

In federated learning, training may be performed via a supervised machine learning problem (e.g., a GD algorithm) based on a dataset $\{(X_k, y_k)\}_{k=1, \ldots, m}$ to learn underlying model parameters $\beta \in R^d$, wherein $X_k$ is the total training data, k is a number of data points (or training symbols) in $X_k$ where k=k to m, and $y_k$ is an associated model level related to each of the data in $X_k$ (e.g., where the underlying model is a single or multi-level model). Each training label is a row vector of training symbols $X_k = [x_{k,1}, \ldots, x_{k,d}] \sqcup R^{1 \times d}$, and $y_k \in R$ is an associated scalar measurement. Under a linear model, the relationship between the dependent (X) and the independent (y) variables is given by Equation (A0).

$$Y = X\beta + n \tag{A0}$$

In Equation (A0), is the model to be created, X is the input data, and Y is/are the output variables. In addition, for Equation (A0), $$X \triangleq \begin{pmatrix} X_1 \\ \vdots \\ X_m \end{pmatrix}$$

is an m×d training symbol matrix, $$\beta \triangleq \begin{pmatrix} \beta_1 \\ \vdots \\ \beta_d \end{pmatrix}$$

is a d×1 unknown model parameter matrix, $$n \triangleq \begin{pmatrix} n_1 \\ \vdots \\ n_m \end{pmatrix}$$

is an m×1 measurement noise (e.g., Gaussian) matrix, and $$Y \triangleq \begin{pmatrix} y_1 \\ \vdots \\ y_m \end{pmatrix}$$

is an m×1 measurement vector collected for training.

GD is an optimization algorithm used to minimize a target function by iteratively moving in the direction of a steepest descent as defined by a negative of the gradient. An objective of GD in ML is to utilize a training dataset D in order to accurately estimate the unknown model $\beta$ over one or more epochs r. In ML, GD is used to update the parameters of the unknown model $\beta$. Parameters refer to coefficients in linear regression and weights in an NN. These objectives are realized in an iterative fashion by computing $\beta^{(r)}$ at the r-th epoch, and evaluating a gradient associated with the squared error cost function defined by $f(\beta^{(r)}) = \|X\beta^{(r)} - Y\|^2$. The cost function indicates how accurate the model $\beta$ is at making predictions for a given set of parameters. The cost function has a corresponding curve and corresponding gradients, where the slope of the cost function curve indicates how the parameters should be changed to make the model $\beta$ more accurate. In other words, the model $\beta$ is used to make predictions, and the cost function is used to update the parameters for the model $\beta$. The gradient of the aforementioned squared-error cost function is given by Equation (A1), and $\beta^{(r)}$ is updated at each epoch r according to Equation (A2).

$$\nabla_\beta f(\beta^{(r)}) = X'(X \beta^{(r)} - Y) \tag{A1}$$

$$\beta^{(r+1)} = \beta^{(r)} - \frac{\mu}{m} \nabla_\beta f(\beta^{(r)}) \tag{A2}$$

In Equation (A2), m is the total number of observations (i.e., data points), $\mu$ is a learning rate (also referred to as an update parameter or step size) for moving down a particular gradient, where) $0 < \mu$ and $\nabla_\beta f(\beta^{(r)})$ is a prediction based on the model $\beta^{(r)}$. GD involves computing Equations (A1) and (A2) in tandem until the model parameters converge sufficiently. The gradient in Equation (A1) involves multiplications involving matrices and vectors of large sizes. Therefore, GD becomes computationally prohibitive as dataset and model parameters become massive.

Figure 12:
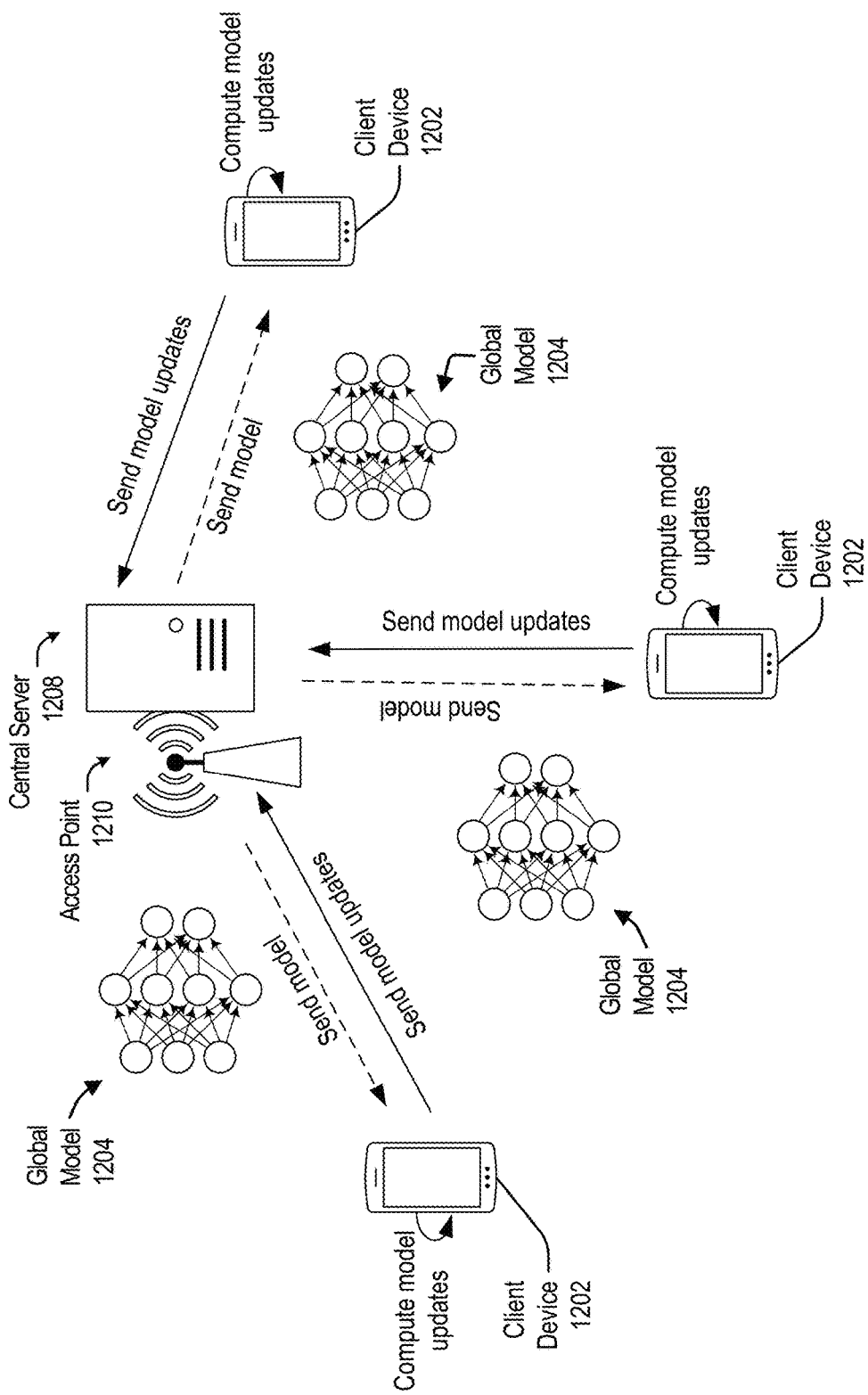
FIG. 12 depicts an example of federated learning in an edge computing network system.

In order to meet computation demand of Equation (A1), edge computing nodes can locally compute partial gradients from their respective local data sets and communicate the computed partial gradients back to a central node for aggregation. FIG. 12 depicts an example of federated learning in an edge computing environment 1200. In the example shown, each client computing node 1202 fetches or otherwise obtains a global model 1204 from a central server 1208 (e.g., a MEC server) coupled to an access point 1210 (e.g., a base station), updates aspects of the global model (e.g., model parameters or weights used in the global model, e.g., NN node weights) using its local data or data provided by the central server (e.g., a subset of a large training dataset D), and communicates the updates to the global model to the central server 1208. The central server 1208 then aggregates (e.g., averages) the received updates and obtains a final global model based on the aggregated updates (e.g., updates the model weight values based on an average of the weight values received from the clients). Federated learning can be more efficient than traditional distributed gradient descent approaches.

Model updates or updates to a global model, as described herein, may include a set of values that are used to construct the global model. For example, where the global model is a NN model, a client or server may perform machine learning to obtain updated values for various nodes of the NN. The values may be aggregated by a node, e.g., averaged by the server, and the aggregated node weight values may be used for future implementations of the NN.

A central server as described herein may refer to an edge compute node that acts as a server to other edge compute notes of an edge computing environment. In some embodiments, functions or operations described herein as being performed by a central server may be performed by multiple servers. For instance, some example embodiments described herein include clients providing capability data, model updates or other parameters to a central server, but such capability data, model updates, or parameters may be provided by the clients to different central servers. The central server(s) may be structurally formed as described further herein. For instance, the central server(s) may be configured to fit within a unit of a server rack (e.g., a 1U or multiple unit rack device), or may be configured to fit within a sled. In some instances, the central server as described herein may be implemented as a "MEC server". However, it is to be understood that any type of server, such as an edge server, a cloud server, an on-premise server, etc. may be used in the alternative. A server, e.g., a MEC server, as described herein may be constructed to fit within any of the structural embodiments described herein. For example, a server such as a MEC server may be configured fit within a server rack or sled, e.g., as described in greater detail herein.

Further, a client (or client compute node) as described herein may refer to an edge compute node that is served, controlled, or otherwise commanded by one or more other edge compute nodes (e.g., central server(s) as described above). For instance, as described herein, the clients perform machine learning based on information and/or commands from another node(s) (i.e., a central server(s)). A client device may include a server device, such as a device structurally configured as described herein (e.g., to fit within a server rack or sled), a mobile computing device (e.g., tablet, smartphone, etc.), or may include another type of computing device.

With this technique, Equation (A1) can be decomposed into m partial sums as shown by Equation (A3).

$$\nabla_\beta f(\beta^{(r)}) = \sum_{k=1}^{m} X_k'(X_k\ \beta^{(r)} - y_k) \quad (A3)$$

More particularly, the training dataset $X^{(i)}$ and the associated label vector $y^{(i)}$ for the i-th device may be given by $$X^{(i)} = \begin{bmatrix} X_1^{(i)} \\ \vdots \\ X_{l_i^{initial}}^{(i)} \end{bmatrix}, \text{ and } y^{(i)} = \begin{bmatrix} y_1^{(i)} \\ \vdots \\ y_{l_i^{initial}}^{(i)} \end{bmatrix},$$

where $l_i^{initial}$ is the number of training data points available at the i-th device. Note that the dimension of $X^{(i)}$ is $l_i^{initial} \times d$, where d is the dimension of feature space. Each device may locally compute partial gradients in each epoch, say the r-th epoch, such as by $$\nabla_\beta f_i(\beta^{(r)}) = \sum_{k=1}^{l_i^{initial}} X_k^{(i)'}(X_k^{(i)}\ \beta^{(r)} - y_k^{(i)}), \quad (A4)$$

where $\beta^{(r)}$ is the estimate of the global model. The partial gradient is communicated to the central node for aggregation, and the global gradient may be given by $$\nabla_\beta f(\beta^{(r)}) = \sum_{i=1}^{n} \nabla_\beta f_i(\beta^{(r)}). \quad (A5)$$

The model may be updated by the central server as $$\beta^{(r+1)} = \beta^{(r)} - \frac{\mu}{m} \nabla_\beta f(\beta^{(r)}), \quad (A6)$$

where $m = \sum_{i=1}^{n} l_i^{initial}$ is the totality of training data points and $\mu$ is the learning rate.

In Sections I.-IG. below, the client computing node corresponds to any edge computing node that is to train a model with the data available to it, such as data that the client computing node may wish to keep private.

In Sections I.-IG. below, according to some embodiments, a message or communication between a first edge computing node and a second edge computing note, or between a client computing node and a central server, may be transmitted/received on an application programming interface (API), embedded in L1/L2/L3 layers of the protocol stack depending on the application, on a Physical (PHY) layer, or on a Medium Access Control (MAC) layer as set forth in wireless standards, such as the 802.11 family of standards, or the Third Generation Partnership Project (3GPP) Long Term Evolution (LTE) or New Radio (NR or 5G) family of technical specifications, by way of example only. The message or communication, according to some embodiments, may involve a parameter exchange to allow an estimation of wireless spectrum efficiency, and in such a case it may be transmitted/received on a L1 layer of a protocol stack. The message or communication, according to some embodiments, may involve a prediction of edge computing node sleep patterns, and in such a case it may be transmitted/received on a L2 layer of a protocol stack. The message or communication, according to some embodiments, may be transmitted or received on a transport network layer, an Internet Protocol (IP) transport layer, a General Radio Packet Service Tunneling Protocol User Plane (GTP-U) layer, a User Datagram Protocol (UDP) layer, an IP layer, on a layer of a control plane protocol stack (e.g. NAS, RRC, PDCP, RLC, MAC, and PHY), on a layer of a user plane protocol stack (e.g. SDAP, PDCP, RLC, MAC, and PHY).

I. Calculation of Gradient at Server Based on Client Coded Data

In federated learning, data collected by clients remain at clients. Instead, the server asks for periodic gradient or model updates from clients to update the learning model. The gradient is calculated on current values of model parameters and on the raw data at each client. Then this gradient is shared with the server. That's how it is still possible to train a common model that can fit to data collected at multiple clients without them sharing the raw data as it is.

In U.S. Patent Publication Number US20190138934 (hereinafter "the '934 publication"), we have pointed out the above framework can suffer (either time-wise or performance-wise) if there are some clients that are too computationally slow to calculate gradients, or that are experiencing one or more poor communication channels. As a result, we have proposed a coded federated learning (CFL) framework, for instance in the same publication as the one referred to above. In CFL, clients share coded data with the server in the beginning of the training, where the data is encoded with a random matrix across observations. The server then estimates the gradient by directly calculating the gradient on this coded data at each iteration, and uses that gradient to compensate for the missing gradients due to straggling clients. Because of certain properties of the random matrices as will be explained further below, the server does not need to decode the data or the gradients calculated on this coded data. In fact, it is not possible for the server to perform such an operation because the encoding matrix is not shared with the server. It is possible to determine the size of the coded data to maintain a level of differential privacy, as explained for example in publication WO2021/158313.

Figure 13:
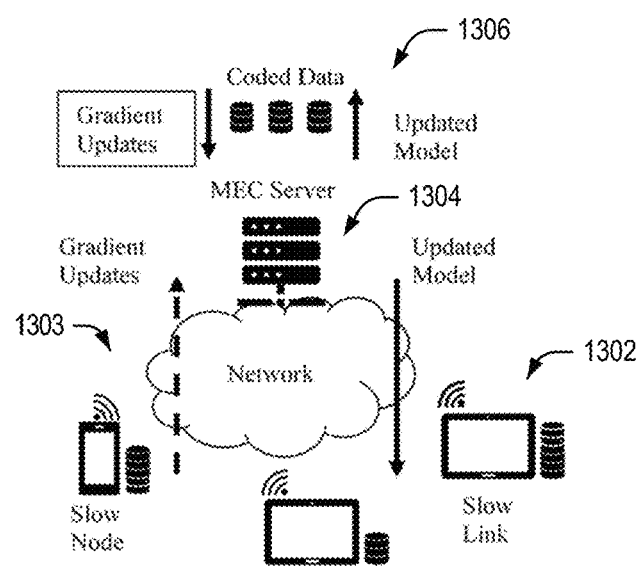
FIG. 13 depicts a coded federated learning environment in an edge cloud network.

Reference is now made to FIG. 13, which shows a CFL framework 1300. In FIG. 13, clients 1302 are connected to a MEC server 1304 via a network 1303. The updated model and gradient updates are communicated between the server and clients. The gradient update on coded data is calculated at the server. As seen in the FIG. 13, once the coded data is shared with MEC server in the beginning, it can help update the model even if there is a slow node or slow link. The gradient calculated on the coded data can either estimate the missing gradient from an individual client or it can provide an additional gradient to combine with the sync-up phase of federated learning.

Embodiments herein, instead of focusing on an individual problem, covers a few more use cases of CFL framework.

Gradient estimates obtained on the coded data can be used in a number of ways in a federated learning environment, such as for client selection, such as selecting clients whose data is the most useful at a current iteration of the learning algorithm before asking for their feedback. This reduces the communication and compute cost while maintaining fast training. Furthermore, the coded data can also be used in estimating other metrics about clients, which in turn can be used at any part of the learning algorithm.

In a general federated learning framework, the raw data is preserved at clients and the common (or dependent) set of parameters are iteratively optimized by a central node. Because of the private nature of the above (raw data preserved at client), any metric whose calculation requires client data and the recent iteration of parameters may be (i) calculated at the client using information regarding the metric or (ii) estimated by its value calculated at a previous iteration of parameters. Calculating these metrics at the time they are needed introduces computation cost to clients, communication cost to all nodes, and delay to the whole system.

Relying on delayed metrics may detrimentally affect the accuracy of the algorithm. As a corner case example, if the importance of clients is determined by gradients for the initial round (initial importance), there is a risk of not getting any updates from some set of clients for the rest of the training rounds if the importance metric for other clients stay high relative to this initial importance value.

Some embodiments propose ways to utilize the coded data at the MEC server (which data is shared by clients in the beginning of training) throughout the algorithm rounds. It uses coded data to estimate certain metrics that can be useful during training in a differentially private way. We show the relevance of coded estimates of metrics to their raw counterparts through theoretical analysis and/or simulations.

Proposed methodologies of embodiments can speed up the training, while maintaining accuracy and certain level of differential privacy which privacy has for example been described in WO2021/247448.

Since the coded data is shared with the server by the clients in the beginning, one can have access to the coded data, and apply the calculations suggested by embodiments to get the same metric estimates as would be calculated by a server being analyzed. If the decisions taken by the server (which are going to be communicated to clients at some point) are the same as ones that would be reached by embodiments, then, there is a likelihood that the same algorithm as that of embodiments is also running at the MEC server being analyzed.

In federated learning, the convergence of the algorithm relies on the parameter updates arriving from clients at each communication round. Under certain conditions, the lack of some of these updates may cause the algorithm to converge to an inaccurate or suboptimum set of parameters, as explained for example in S. Prakash, S. Dhakal, M. Akdeniz, A. S. Avestimehr and N. Himayat, "Coded Computing for Federated Learning at the Edge," ICML Workshops, 2020, https://arxiv.org/abs/2007.03273 (hereafter "CC for FL"), which is incorporated herein by reference in its entirety. In order to combat with the lack of parameter updates, a coded federated learning scheme has been proposed such as in CC for FL, and in the '934 publication.

In a supervised coded federated learning scheme, in the beginning of a training session, every client i sends a coded version $(\tilde{X}_i, \tilde{y}_i)$ of its data $(X_i, y_i)$ to the server after encoding the data with a Gaussian random matrix, $$G_i = [g_i^1 \; g_i^2 \; \ldots \; g_i^{c_i}]^T, \; g_i \cdot \mathcal{N}\left(0, \frac{1}{m_i} \mathbb{I}^{m_i \times m_i}\right),$$

that is generated and known only by client i:

$$(\tilde{X}_i, \tilde{y}_i) = (G_i X_i, G_i y_i) \quad \text{Eq. (I1)}$$

where $c_i$ is the number of coded observations and $m_i$ is the total number of observations at client i. $X_i$ corresponds to the input and $y_i$ corresponds to the labels.

When the model to fit is linear, i.e. $\hat{y}_i = X_i \beta$, where $\beta$ is the model, and the loss function is the Mean Squared Error (MSE), $$L_i = \frac{1}{2m_i} \|\hat{y}_i - y_i\|^2,$$

the gradient on the raw data will be:

$$\nabla_\beta^i = \frac{1}{m_i} X_i^T (X_i \beta - y_i) \quad \text{Eq. (I2)}$$

Similarly, if we calculate the gradient on the coded data, then $$\tilde{\nabla}_\beta^i = \frac{1}{c_i} \tilde{X}_i^T (\tilde{X}_i \beta - \tilde{y}_i) = \quad \text{Eq. (I3)}$$

$$\frac{1}{c_i} X_i^T G_i^T (G_i X_i \beta - G_i y_i) = \frac{1}{c_i} X_i^T G_i^T G_i (X_i \beta - y_i)$$

Note that $$\frac{1}{c_i} G_i^T G_i \approx \frac{1}{m_i} \mathbb{I},$$

due to the law of large numbers. Therefore, $\tilde{\nabla}_\beta^i \approx \nabla_\beta^i$.

There are also encoding matrices other than Gaussian that satisfy the same property, $$\frac{1}{c_i} G_i^T G_i \approx \frac{1}{m_i} \mathbb{I},$$

These matrices include randomized orthonormal systems (ROS), e.g. Hadamard, uniform sampling, leverage score sampling, or matrix multiplications of these in any order as set forth for example in B. Bartan and M. Pilanci, "Distributed Sketching Methods for Privacy Preserving Regression," 2020, https://arxiv.org/abs/2002.06538 (hereafter "DSM for PPR"), which is incorporated herein by reference in its entirety.

The above encoding schemes can further include addition of a zero-mean noise independent from the data or encoding matrix as set forth below:

$$(\tilde{X}_i, \tilde{y}_i) = (G_i X_i + N_i, G_i y_i + w_i) \qquad \text{Eq. (14)}$$

The additive noise help with ensuring privacy, but at the cost of introducing bias to the estimation of the gradient and other metrics.

In the remaining part of the instant description, other uses of gradient approximation as well as the approximation of other metrics and their use are described.

IA. Other Uses of Gradient Approximation

The norm of the gradient received from a client can indicate the discrepancy between the solution at the current iteration versus the optimum set of parameters for that client. Depending on the application, the algorithm may want to prioritize clients based on this discrepancy. Since the gradient on the coded data approximates the gradient that can be received from the client, it can also be an indicator in forming the set of prioritized clients in advance.

IB. Approximation and Uses of Label Distribution

When the labels are coming from a set of one-hot vectors, $$\frac{1}{m_i} y_i^T y_i$$

becomes diagonal, the same as its coded counterpart $$\frac{1}{c_i} \tilde{y}_i^T \tilde{y}_i,$$

and the diagonal entries of $$\frac{1}{m_i} y_i^T y_i$$

are the empirical estimates of the probability density function for a corresponding label.

According to the above:

$$\text{diag}\left(\frac{1}{c_i} \tilde{y}_i^T \tilde{y}_i\right)$$

can be used to approximate label distribution; this approximation can be used for client clustering. In WO2021/247448, we had proposed that each client reports probability mass function (PMF) of their local data labels to the MEC server, i.e., histogram of local data labels over C classes. This method, however, can lead to privacy leaks because it reveals the label distribution. However, according to some embodiments, the server can utilize $$\text{diag}\left(\frac{1}{c_i} \tilde{y}_i^T \tilde{y}_i\right)$$

to obtain the PMF of labels. A clustering algorithm as proposed in DSM for PPR can then be utilized to group similar clients based on the distances of their distributions, e.g., Kullback-Leibler (KL) divergence or L2 distance.

IC. Approximation and Uses of Second Order Statistics

The second order statistics of the data can be approximated by the empirical average:

$$E[x_i^T x_i] \approx \frac{1}{m_i} X_i^T X_i \qquad \text{Eq. (IC1)}$$

Then this can further be estimated by the coded data:

$$E[x_i^T x_i] \approx \frac{1}{m_i} X_i^T X_i \approx \frac{1}{c_i} \tilde{X}_i^T \tilde{X}_i \qquad \text{Eq. (IC2)}$$

The other second order statistics $E[y_i^T x_i]$, $E[x_i^T y_i]$, and $E[y_i^T y_i]$ can be approximated similarly.

The covariance matrix of the data allows training for linear models. Estimating covariance matrix in a differentially private way helps to train the model private as well.

Principal component analysis of the covariance matrix can be useful in learning algorithms. See K. Amin, T. Dick, A. Kulesza, A. Munoz and S. Vassilvitskii, "Differentially Private Covariance Estimation," in *Advances in Neural Information Processing Systems (NIPS)* 32, Curran Associates, Inc., 2019, pp. 14213-14222. (hereinafter DPCE). Principal components and eigenvalues help determine the data heterogeneity across clients as well as the kernel space for per-client data/gradient compression for a training algorithm. A proposed method embodiment, along with WO2021/158313, allows an estimation of these principal components through the covariance matrix estimate calculated on coded data whereas authors in DPCE propose another way of sharing principal components with the server.

ID. Approximation and Uses of Instantaneous Loss

In WO2021/158313, we proposed that the training loss $$L_i = \frac{1}{2m_i} \|\hat{y}_i - y_i\|^2$$

can be reported by clients. This allows us to calculate sampling probability of client i as $q_i = L_i / \Sigma L_i$. In some embodiments, the server computes loss on the coded data as $$\tilde{L}_i = \frac{1}{2c_i} \|\tilde{X}_i \beta - \tilde{y}_i\|^2 = 1/2c_i (G_i X_i \beta - G_i y_i)^T (G_i X_i \beta - G_i y_i).$$

Under the above assumption stated, i.e., $$\frac{1}{c_i} G_i^T G_i \approx \frac{1}{m_i} \mathbf{I},$$

we approximate training loss $L_i$ using $\tilde{L}_i$ which is utilized to approximate the instantaneous loss where $\beta$ is the current model.

IE. Approximation and Uses of Norm of Gradient Differences between Clients

In B. Mirzasoleiman, J. Bilmes and J. Leskovec, "Coresets for Data-efficient Training of Machine Learning Models," ICML, 2020, hereinafter "CDET," which is incorporated herein by reference in its entirety a method was proposed to subsample datapoints for training using submodular maximization framework. This method can be easily extended for client selection where the goal is to select the subset of clients that approximate the true gradients when using a gradient-based algorithm for training.

Specifically, at each training step, the proposed greedy algorithm selects a client such that it reduces the upper bound on the gradient estimation error the most. The upper bound on the gradient estimation error, is for example, calculated as the normed difference of the average gradients between clients given the model $\beta$ at current time.

In this embodiment, we approximate the normed difference of the average gradients, i.e., using the normed difference of the average of the coded gradients between clients.

We simply approximate the metric as follows:

$$\left\| \nabla_\beta^i - \nabla_\beta^j \right\| = \left\| \frac{1}{c_i} X_i^T (X_i \beta - y_i) - \frac{1}{c_j} X_j^T (X_j \beta - y_j) \right\| \approx \quad \text{Eq. (IE1)}$$

$$\left\| \frac{1}{c_i} \tilde{X}_i^T (\tilde{X}_i \beta - \tilde{y}_i) - \frac{1}{c_j} \tilde{X}_j^T (\tilde{X}_j \beta - \tilde{y}_j) \right\|$$

Figure 14:
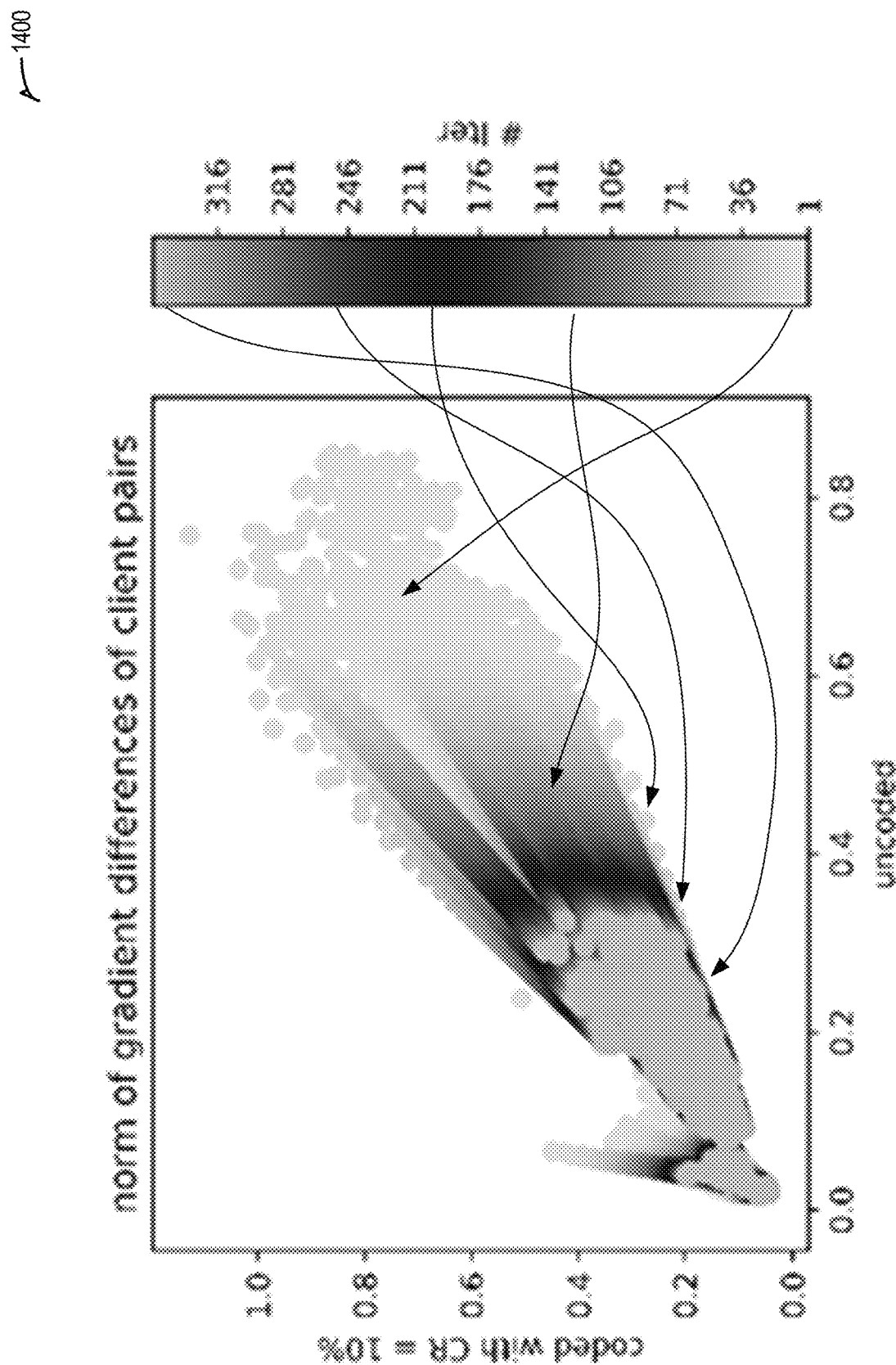
FIG. 14 shows a graph depicting norm of gradient differences of client pairs, plotting coded versus uncoded data.
Figure 15:
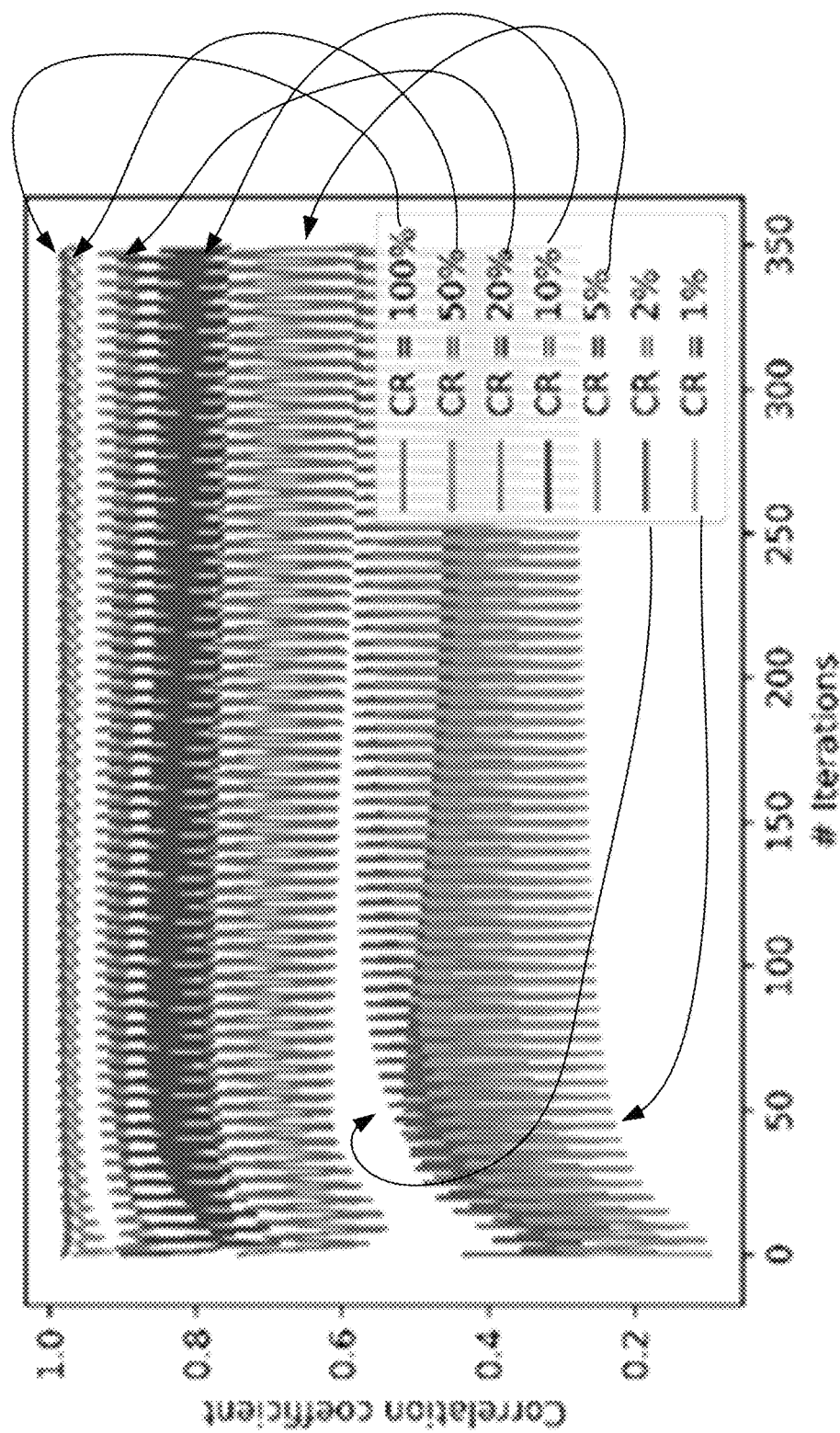
FIG. 15 shows a graph plotting correlation coefficient against number of training iterations across various data coding rates (CR).

FIGS. 14 and 15 show the relationships in the form of respective graphs 1400 and 1500 between the metric of interest calculated on coded and uncoded data respectively. The correlation coefficient is as high as 0.8 when the encoding rate is 10%.

This metric can help determine the set of clients that would ask for more change in parameters.

IF. Uses of the Coded Data Itself

MEC server can train an initial model on the coded data in order to optimize hyper parameters of the federated learning including:
the learning rate and momentum,
depth and size of the learning model,
hyper-parameters for mapping the raw data to another feature space (e.g. kernel extension) such as:
  the dimension and standard deviation of the kernel space in CC for FL used for feature extension for better fit of the model.
  parameters for compression of features to decrease the model size, hence the communication and computation cost.
subset of clients to choose when implementing client selection on coded federated learning framework, as explained in WO2021/158313.
  Other uses of coded data can be:
    IID Data Generation: Encoding across clients can be a way for generating an IID data set from non-IID data distribution across clients.
    Applications to Robust Federated Learning in the Presence of Byzantine Users: The coded data set could also potentially help mitigate adversarial attacks from byzantine users during federated training. The sever can compute gradients from the coded data set as guiding gradients to limit the influence of poisoning attacks during training. This could be especially beneficial if the "privacy preserving" coded data is shared under a secure sharing mechanism from a sample of users.

IG. Additional Data to Combine with the Coded Data

In addition to coded data, MEC can ask for additional metrics calculated on the raw data from clients when estimating the metrics mentioned above. These metrics include first order statistics, i.e. $E[X_i]$, $E[y_i]$. These metrics can be sent to the MEC server before or along with the coded data.

FIG. 14 shows a graph depicting norm of gradient differences of client pairs, plotting coded versus uncoded data. As can be seen in FIG. 14, the norm of gradient differences of client pairs does not appear to be affected significantly by whether the data is coded or uncoded.

FIG. 15 shows a graph plotting correlation coefficient against number of training iterations across various data coding rates (CR). As can be seen in FIG. 15, the influence of the number of iterations on correlation coefficient diminishes with increasing coding rates. Coding rates above 20% show more stable correlations after about 50 iterations in the shown example.

Figure 16:
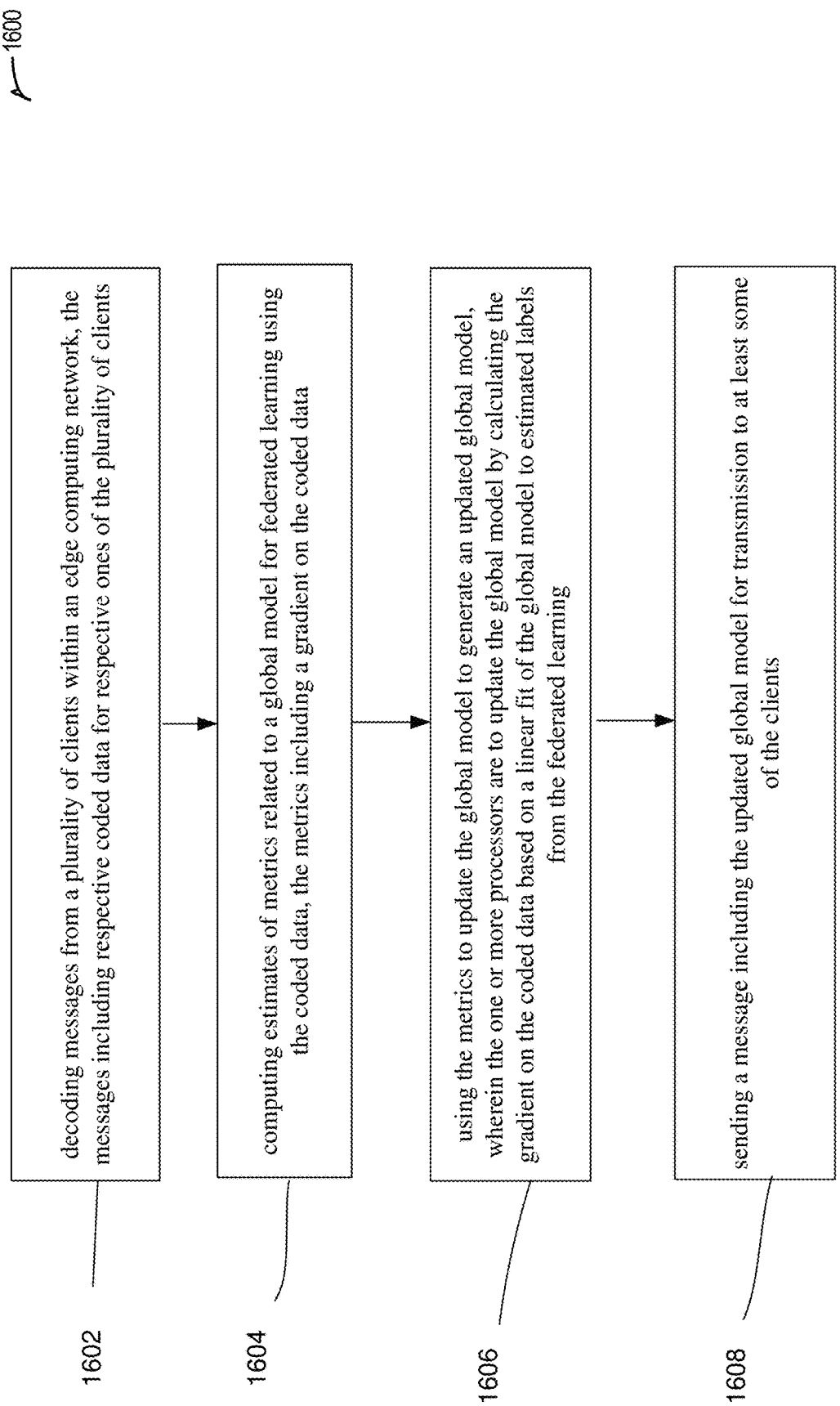
FIG. 16 shows a process according to some embodiments.

FIG. 16 shows a process 1600 according to some embodiments. At operation 1602, the process includes decoding messages from a plurality of clients within an edge computing network, the messages including respective coded data for respective ones of the plurality of clients. At operation 1604, the process includes computing estimates of metrics related to a global model for federated learning using the coded data, the metrics including a gradient on the coded data. At operation 1606, the process includes using the metrics to update the global model to generate an updated global model, wherein the one or more processors are to update the global model by calculating the gradient on the coded data based on a linear fit of the global model to estimated labels from the federated learning. At operation 1608, the process includes sending a message including the updated global model for transmission to at least some of the clients.

J. Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" an edge computing node is meant to refer to a "component" of "node," such as of a central node, central server, server, client node, client computing node, client device, client or user, as the component is defined above. A client, client node, or client compute/computing node may refer to an edge computing node that is serving as a client device. The "apparatus" as referred to herein may refer, for example, to a processor such as processor 852 of edge computing node 950 FIG. 9, or to the processor 852 of FIG. 9 along with any other components of the edge computing node 950 of FIG. 9, or, for example to circuitry corresponding to a computing node 515 or 523 with virtualized processing capabilities as described in FIG. 5.

EXAMPLES

Example AA1 includes an apparatus of an edge computing node to be operated in an edge computing network, the apparatus including: an interconnect interface to connect the apparatus to one or more components of the edge computing node; and one or more processors to: decode messages from a plurality of clients within the edge computing network, the messages including respective coded data for respective ones of the plurality of clients; compute estimates of metrics related to a global model for federated learning using the coded data, the metrics including a gradient on the coded data; use the metrics to update the global model to generate an updated global model, wherein the one or more processors are to update the global model by calculating the gradient on the coded data based on a linear fit of the global model to estimated labels from the federated learning; and send a message including the updated global model for transmission to at least some of the clients.

Example AA2 includes the subject matter of Example AA1, wherein the coded data includes raw data that is encoded using a randomized orthonormal system (ROS) matrix.

Example AA3 includes the subject matter of Example AA2, wherein the ROS matrix includes a Gaussian random matrix.

Example AA3.1 includes the subject matter of Example AA2, wherein the coded data includes the raw data encoded using the ROS matrix, plus an additive noise parameter.

Example AA3.2 includes the subject matter of Example AA3.1, wherein the additive noise parameter corresponds to a zero mean noise.

Example AA4 includes the subject matter of Example AA1, wherein computing estimates of metrics includes estimating, for individual ones i of at least some of the clients, a gradient on associated coded data i based on an inverse of a number of coded observations that correspond to the associated coded data i, and further based on a transposition of a matrix of the associated coded data i.

Example IAA1 includes the subject matter of Example AA1, the one or more processors to further to select clients from the plurality of clients for a subsequent round of federated learning based on respective norms of respective local gradients of coded data sent to the apparatus by respective ones of the plurality of clients.

Example IAA2 includes the subject matter of Example IAA1, the one or more processors to select the clients with norms of their respective local gradients that are above a threshold.

Example IAB1 includes the subject matter of Example AA1, wherein, for labels resulting from federated learning performed on the coded data that correspond to respective one-hot vectors, the one or more processors are to further cluster the clients for a subsequent round of the federated learning based on diagonal entries of an estimate of a probability density function (PDF) matrix for each label $\tilde{y}_i$, the PDF matrix corresponding to $$\frac{1}{c_i}\tilde{y}_i^T \tilde{y}_i,$$

where $c_i$ is a number or coded observations corresponding to coded data from client i, $\tilde{y}_i$ is a label matrix resulting from federated learning performed on the coded data from client i, and $\tilde{y}_i^T$ is a transposed form of $\tilde{y}_i$.

Example IAB2 includes the subject matter of Example AA1, the one or more processors to use diagonal entries of the PDF matrix to determine an estimate of a probability mass function (PMF) for coded data from individual clients i, and to cluster the clients based on the PMF.

Example IAB3 includes the subject matter of Example IAC1, where the PMF for coded data from individual clients i corresponds to at least one of a PMF of coded training data at the individual clients i, or a PMF of labels corresponding to the coded training data at the individual clients i.

Example IAC1 includes the subject matter of Example AA1, wherein the one or more processors are to estimate a principal component of a covariance matrix based on the coded data.

Example IAC2 includes the subject matter of Example IAC1, wherein the one or more processors are to determine an approximation of the second order statistics of the coded data to estimate the principal component of the covariance matrix.

Example IAC3 includes the subject matter of Example IAC2, wherein the approximation of the second order statistics is to be based on at least one of: coded training data at the individual clients i; or labels corresponding to the coded training data at the individual clients i.

Example IAD1 includes the subject matter of Example AA1, wherein the one or more processors are to determine an approximation of a training loss per client i using the coded data.

Example IAD2 includes the subject matter of Example IAD1, wherein the one or more processors are to determine the approximation based on an inverse of a number of coded observations that correspond to the associated coded data i, and further based on a squared error cost function for client i of the global model, where the squared error cost function is in turn based on the coded data.

Example IAE1 includes the subject matter of Example AA1, wherein the one or more processors are to, for each training round, select a corresponding client for the federated learning based on reducing an upper bound on an estimation error of a gradient relating to the coded data.

Example IAE2 includes the subject matter of Example IAE1, wherein the upper bound is based on a normed difference of approximated gradients of coded data as between pairs of clients i and j given a current global model.

Example IAE3 includes the subject matter of Example IAE2, wherein, for an individual client i, an approximated gradient is based on an inverse of a number of coded observations that correspond to the associated coded data i, and further based on a squared error cost function for client i of the global model, where the squared error cost function is in turn based on the coded data.

Example IAF1 includes the subject matter of Example AA1, wherein the one or more processors are to train an initial model on the coded data in order to optimize hyper parameters of the federated learning, the hyper parameters including at least one of: learning rate and momentum, depth or size of the model, hyper parameters for mapping the raw data to another feature space, or a subset of clients to choose when implementing client selection on a coded federated learning framework.

Example IAF2 includes the subject matter of Example AA1, wherein the one or more processors are to use the coded data generate independent and identically distributed (IID) data from non IID data distribution at the clients.

Example IAF3 includes the subject matter of Example AA1, wherein the one or more processors are to use the updated global model to identify a byzantine client during the federated learning.

Example IAG1 includes the subject matter of Example AA1, wherein the one or more processors are to cause a request to be transmitted to at least some of the clients for metrics calculated on raw data.

Example IAG2 includes the subject matter of Example IAG1, wherein the metrics include first order statistics based on at least one of: coded training data at the individual clients i; or labels corresponding to the coded training data at the individual clients i.

Example IAG3 The apparatus of IAG2, wherein the one or more processors are to receive the first order statistics one of before receiving the coded data, or along with receiving the coded data.

Example MA1 includes a method to be performed at an apparatus of an edge computing node of an edge computing network, the method including: decoding messages from a plurality of clients within the edge computing network, the messages including respective coded data for respective ones of the plurality of clients; computing estimates of metrics related to a global model for federated learning using the coded data, the metrics including a gradient on the coded data; using the metrics to update the global model to generate an updated global model, wherein the one or more processors are to update the global model by calculating the gradient on the coded data based on a linear fit of the global model to estimated labels from the federated learning; and sending a message including the updated global model for transmission to at least some of the clients.

Example MA2 includes the subject matter of Example MA1, wherein the coded data includes raw data that is encoded using a randomized orthonormal system (ROS) matrix.

Example MA3 includes the subject matter of Example MA2, wherein the ROS matrix includes a Gaussian random matrix.

Example MA3.1 includes the subject matter of Example MA2, wherein the coded data includes the raw data encoded using the ROS matrix, plus an additive noise parameter.

Example MA3.2 includes the subject matter of Example MA3.1, wherein the additive noise parameter corresponds to a zero mean noise.

Example MA4 includes the subject matter of Example MA1, wherein computing estimates of metrics includes estimating, for individual ones i of at least some of the clients, a gradient on associated coded data i based on an inverse of a number of coded observations that correspond to the associated coded data i, and further based on a transposition of a matrix of the associated coded data i.

Example IMA1 includes the subject matter of Example MA1, the method further including selecting clients from the plurality of clients for a subsequent round of federated learning based on respective norms of respective local gradients of coded data sent to the apparatus by respective ones of the plurality of clients.

Example IMA2 includes the subject matter of Example IMA1, the method further including selecting the clients with norms of their respective local gradients that are above a threshold.

Example IMB1 includes the subject matter of Example MA1, wherein, for labels resulting from federated learning performed on the coded data that correspond to respective one-hot vectors, the one or more processors are to further cluster the clients for a subsequent round of the federated learning based on diagonal entries of an estimate of a probability density function (PDF) matrix for each label $\tilde{y}_i$, the PDF matrix corresponding to $$\frac{1}{c_i}\tilde{y}_i^T \tilde{y}_i,$$

where ci is a number of coded observations corresponding to coded data from client i, $\tilde{y}_i$ is a label matrix resulting from federated learning performed on the coded data from client i, and $\tilde{y}_i^T$ is a transposed form of $\tilde{y}_i$.

Example IMB2 includes the subject matter of Example MA1, the method further including using diagonal entries of the PDF matrix to determine an estimate of a probability mass function (PMF) for coded data from individual clients i, and to cluster the clients based on the PMF.

Example IMB3 includes the subject matter of Example IMC1, where the PMF for coded data from individual clients i corresponds to at least one of a PMF of coded training data at the individual clients i, or a PMF of labels corresponding to the coded training data at the individual clients i.

Example IMC1 includes the subject matter of Example MA1, the method further including estimating a principal component of a covariance matrix based on the coded data.

Example IMC2 includes the subject matter of Example IMC1, the method further including determining an approximation of the second order statistics of the coded data to estimate the principal component of the covariance matrix.

Example IMC3 includes the subject matter of Example IMC2, wherein the approximation of the second order statistics is to be based on at least one of: coded training data at the individual clients i; or labels corresponding to the coded training data at the individual clients i.

Example IMD1 includes the subject matter of Example MA1, the method further including determining an approximation of a training loss per client i using the coded data.

Example IMD2 includes the subject matter of Example IMD1, the method further including determining the approximation based on an inverse of a number of coded observations that correspond to the associated coded data i, and further based on a squared error cost function for client i of the global model, where the squared error cost function is in turn based on the coded data.

Example IME1 includes the subject matter of Example MA1, the method further including, for each training round, selecting a corresponding client for the federated learning based on reducing an upper bound on an estimation error of a gradient relating to the coded data.

Example IME2 includes the subject matter of Example IME1, wherein the upper bound is based on a normed difference of approximated gradients of coded data as between pairs of clients i and j given a current global model.

Example IME3 includes the subject matter of Example IME2, wherein, for an individual client i, an approximated gradient is based on an inverse of a number of coded observations that correspond to the associated coded data i, and further based on a squared error cost function for client i of the global model, where the squared error cost function is in turn based on the coded data.

Example IMF1 includes the subject matter of Example MA1, the method further including training an initial model on the coded data in order to optimize hyper parameters of the federated learning, the hyper parameters including at least one of: learning rate and momentum, depth or size of the model, hyper parameters for mapping the raw data to another feature space, or a subset of clients to choose when implementing client selection on a coded federated learning framework.

Example IMF2 includes the subject matter of Example MA1, the method further including using the coded data generate independent and identically distributed (IID) data from non IID data distribution at the clients.

Example IMF3 includes the subject matter of Example MA1, the method further including using the updated global model to identify a byzantine client during the federated learning.

Example IMG1 includes the subject matter of Example MA1, the method further including causing a request to be transmitted to at least some of the clients for metrics calculated on raw data.

Example IMG2 includes the subject matter of Example IMG1, wherein the metrics include first order statistics based on at least one of: coded training data at the individual clients i; or labels corresponding to the coded training data at the individual clients i.

Example IMG3 includes the subject matter of Example IMG2, the method further including receiving the first order statistics one of before receiving the coded data, or along with receiving the coded data.

Example CRMA1 includes a tangible non-transitory computer readable storage medium including instructions which, when executed by one or more processors of s of an edge computing node of an edge computing network, cause the one or more processors to: decode messages from a plurality of clients within the edge computing network, the messages including respective coded data for respective ones of the plurality of clients; compute estimates of metrics related to a global model for federated learning using the coded data, the metrics including a gradient on the coded data; use the metrics to update the global model to generate an updated global model, wherein the one or more processors are to update the global model by calculating the gradient on the coded data based on a linear fit of the global model to estimated labels from the federated learning; and send a message including the updated global model for transmission to at least some of the clients.

Example CRMA2 includes the subject matter of Example CRMA1, wherein the coded data includes raw data that is encoded using a randomized orthonormal system (ROS) matrix.

Example CRMA3 includes the subject matter of Example CRMA2, wherein the ROS matrix includes a Gaussian random matrix.

Example CRMA3.1 includes the subject matter of Example CRMA2, wherein the coded data includes the raw data encoded using the ROS matrix, plus an additive noise parameter.

Example CRMA3.2 includes the subject matter of Example CRMA3.1, wherein the additive noise parameter corresponds to a zero mean noise.

Example CRMA4 includes the subject matter of Example CRMA1, wherein computing estimates of metrics includes estimating, for individual ones i of at least some of the clients, a gradient on associated coded data i based on an inverse of a number of coded observations that correspond to the associated coded data i, and further based on a transposition of a matrix of the associated coded data i.

Example ICRMA1 includes the subject matter of Example CRMA1, the one or more processors to further to select clients from the plurality of clients for a subsequent round of federated learning based on respective norms of respective local gradients of coded data sent to the apparatus by respective ones of the plurality of clients.

Example ICRMA2 includes the subject matter of Example ICRMA1, the one or more processors to select the clients with norms of their respective local gradients that are above a threshold.

Example ICRMB1 includes the subject matter of Example CRMA1, wherein, for labels resulting from federated learning performed on the coded data that correspond to respective one-hot vectors, the one or more processors are to further cluster the clients for a subsequent round of the federated learning based on diagonal entries of an estimate of a probability density function (PDF) matrix for each label $\tilde{y}_i$, the PDF matrix corresponding to $$\frac{1}{c_i}\tilde{y}_i^T \tilde{y}_i,$$

where ci is a number of coded observations corresponding to coded data from client i, $\tilde{y}_i$ is a label matrix resulting from federated learning performed on the coded data from client i, and $\tilde{y}_i^T$ is a transposed form of $\tilde{y}_i$.

Example ICRMB2 includes the subject matter of Example CRMA1, the one or more processors to use diagonal entries of the PDF matrix to determine an estimate of a probability mass function (PMF) for coded data from individual clients i, and to cluster the clients based on the PMF.

Example ICRMB3 includes the subject matter of Example ICRMC1, where the PMF for coded data from individual clients i corresponds to at least one of a PMF of coded training data at the individual clients i, or a PMF of labels corresponding to the coded training data at the individual clients i.

Example ICRMC1 includes the subject matter of Example CRMA1, wherein the one or more processors are to estimate a principal component of a covariance matrix based on the coded data.

Example ICRMC2 includes the subject matter of Example ICRMC1, wherein the one or more processors are to determine an approximation of the second order statistics of the coded data to estimate the principal component of the covariance matrix.

Example ICRMC3 includes the subject matter of Example ICRMC2, wherein the approximation of the second order statistics is to be based on at least one of: coded training data at the individual clients i; or labels corresponding to the coded training data at the individual clients i.

Example ICRMD1 includes the subject matter of Example CRMA1, wherein the one or more processors are to determine an approximation of a training loss per client i using the coded data.

Example ICRMD2 includes the subject matter of Example ICRMD2, wherein the one or more processors are to determine the approximation based on an inverse of a number of coded observations that correspond to the associated coded data i, and further based on a squared error cost function for client i of the global model, where the squared error cost function is in turn based on the coded data.

Example ICRME1 includes the subject matter of Example CRMA1, wherein the one or more processors are to, for each training round, select a corresponding client for the federated learning based on reducing an upper bound on an estimation error of a gradient relating to the coded data.

Example ICRME2 includes the subject matter of Example ICRME1, wherein the upper bound is based on a normed difference of approximated gradients of coded data as between pairs of clients i and j given a current global model.

Example ICRME3 includes the subject matter of Example ICRME2, wherein, for an individual client i, an approximated gradient is based on an inverse of a number of coded observations that correspond to the associated coded data i, and further based on a squared error cost function for client i of the global model, where the squared error cost function is in turn based on the coded data.

Example ICRMF1 includes the subject matter of Example CRMA1, wherein the one or more processors are to train an initial model on the coded data in order to optimize hyper parameters of the federated learning, the hyper parameters including at least one of: learning rate and momentum, depth or size of the model, hyper parameters for mapping the raw data to another feature space, or a subset of clients to choose when implementing client selection on a coded federated learning framework.

Example ICRMF2 includes the subject matter of Example CRMA1, wherein the one or more processors are to use the coded data generate independent and identically distributed (IID) data from non IID data distribution at the clients.

Example ICRMF3 includes the subject matter of Example CRMA1, wherein the one or more processors are to use the updated global model to identify a byzantine client during the federated learning.

Example ICRMG1 includes the subject matter of Example CRMA1, wherein the one or more processors are to cause a request to be transmitted to at least some of the clients for metrics calculated on raw data.

Example ICRMG2 includes the subject matter of Example ICRMG1, wherein the metrics include first order statistics based on at least one of: coded training data at the individual clients i; or labels corresponding to the coded training data at the individual clients i.

Example ICRMG3 the subject matter of Example ICRMG2, wherein the one or more processors are to receive the first order statistics one of before receiving the coded data, or along with receiving the coded data.

Example IU1 includes one or more computer readable media comprising instructions, wherein execution of the instructions by processor circuitry is to cause the one or more processors circuitry to perform the method of any one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-Example IMG3.

Example IU2 includes a computer program comprising the instructions of Example IU1.

Example IU3 includes an Application Programming Interface defining functions, methods, variables, data structures, and/or protocols for the instructions of Example IU1.

Example IU4 includes an apparatus comprising circuitry loaded with the instructions of Example IU1.

Example IU5 includes an apparatus comprising circuitry operable to run the instructions of Example IU1.

Example IU6 includes an integrated circuit comprising one or more of the one or more processors circuitry of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-IAG3 and the one or more computer readable media of Example IU1.

Example IU7 includes a computing system comprising the one or more computer readable media and the one or more processors circuitry of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-Example IAG3.

Example IU8 includes an apparatus comprising means for executing instructions of Example IU1.

Example IU9 includes a signal generated as a result of executing the instructions of Example IU1.

Example IU10 includes a data unit generated as a result of executing the instructions of Example IU9.

Example IU11 includes the data unit of Example IU10, wherein the data unit is a datagram, network packet, data frame, data segment, a Protocol Data Unit (PDU), a Service Data Unit (SDU), a message, or a database object.

Example IU12 includes a signal encoded with the data unit of any one of Examples IU10 and IU11.

Example IU13 includes an electromagnetic signal carrying the instructions of Example IU12.

Example IU14 includes an apparatus comprising means for performing the method of any one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-Example IMG3.

ADDITIONAL EXAMPLES

Example L1 includes an apparatus comprising means to perform one or more elements of a method of any one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3.

Example L2 includes one or more non-transitory computer-readable media comprising instructions to cause an electronic device, upon execution of the instructions by one or more processors of the electronic device, to perform one or more elements of a method of any one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3.

Example L3, includes a machine-readable storage including machine-readable instructions which, when executed, implement the method of any one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3.

Example L4 includes an apparatus comprising: one or more processors and one or more computer-readable media comprising instructions that, when executed by the one or more processors, cause the one or more processors to perform the method of any of one of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3.

Example L5 includes the apparatus of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-IAG3, further including a transceiver coupled to the one or more processors, and one or more antennas coupled to the transceiver, the antennas to send and receive wireless communications from other edge computing nodes in the edge computing network.

Example L6 includes the apparatus of Example L5, further including a system memory coupled to the one or more processors, the system memory to store instructions, the one or more processors to execute the instructions to perform the training.

Example L7 includes an apparatus comprising logic, modules, or circuitry to perform one or more elements of a method described in or related to any of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or any other method or process described herein.

Example L8 includes a method, technique, or process as described in or related to any of Examples MA1-MA3, MA3.1-MA3.2, MA4, IMA1-IMA2, IMB1-IMB3, IMC1-

IMC3, IMD1-IMD2, IME1-IME3, IMF1-IMF3, and IMG1-IMG3, or portions or parts thereof.

Example L9 includes an apparatus comprising: one or more processors and one or more computer-readable media comprising instructions that, when executed by the one or more processors, cause the one or more processors to perform the method, techniques, or process as described in or related to any of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or portions thereof.

Example L10 includes a signal as described in or related to any of the examples herein, or portions or parts thereof.

Example L11 includes a datagram, packet, frame, segment, protocol data unit (PDU), or message as described in or related to any of the examples herein, or portions or parts thereof, or otherwise described in the present disclosure.

Example L12 includes a signal encoded with data as described in or related to any of the examples herein, or portions or parts thereof, or otherwise described in the present disclosure.

Example L13 includes a signal encoded with a datagram, packet, frame, segment, protocol data unit (PDU), or message as described in or related to any of the examples herein, or portions or parts thereof, or otherwise described in the present disclosure.

Example L14 includes an electromagnetic signal carrying computer-readable instructions, wherein execution of the computer-readable instructions by one or more processors are to cause the one or more processors to perform the method, techniques, or process as described in or related to any of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or portions thereof.

Example L15 includes a computer program comprising instructions, wherein execution of the program by a processing element is to cause the processing element to carry out the method, techniques, or process as described in or related to any of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or portions thereof.

Example L15.5 includes a message or communication between a client computing node and a central server, substantially as shown and described herein, wherein the message or communication is to be transmitted/received on an application programming interface (API), or, especially when used to enhance a wireless network, embedded in L1/L2/L3 layers of the protocol stack depending on the application.

Example L5.6 includes a message or communication between a client computing node and a central server, substantially as shown and described herein, wherein the message or communication is to be transmitted/received on a Physical (PHY) layer, or on a Medium Access Control (MAC) layer as set forth in wireless standards, such as the 802.11 family of standards, or the Third Generation Partnership Project (3GPP) Long Term Evolution (LTE) or New Radio (NR or 5G) family of technical specifications.

Example L5.7 includes a message or communication between a client computing node and a central server, substantially as shown and described herein, wherein the message or communication involves a parameter exchange as described above to allow an estimation of wireless spectrum efficiency, and is to be transmitted/received on a L1 layer of a protocol stack.

Example L5.8 includes a message or communication between a first edge computing node and a second edge computing note, or between a client computing node and a central server, substantially as shown and described herein, wherein the message or communication involves the communication of coded data edge at the client node, and is to be transmitted/received on a L2 layer of a protocol stack.

Example L5.9 includes a message or communication between a first edge computing node and a second edge computing note, or between a client computing node and a central server, substantially as shown and described herein, wherein the message or communication is to be transmitted or received on a transport network layer, an Internet Protocol (IP) transport layer, a General Radio Packet Service Tunneling Protocol User Plane (GTP-U) layer, a User Datagram Protocol (UDP) layer, an IP layer, on a layer of a control plane protocol stack (e.g. NAS, RRC, PDCP, RLC, MAC, and PHY), on a layer of a user plane protocol stack (e.g. SDAP, PDCP, RLC, MAC, and PHY).

Example L16 includes a signal in a wireless network as shown and described herein.

Example L17 includes a method of communicating in a wireless network as shown and described herein.

Example L18 includes a system for providing wireless communication as shown and described herein.

Example NODE1 includes an edge compute node comprising the apparatus of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-IAG3, and further comprising a transceiver coupled to the one or more processors, and one or more antennas coupled to the transceiver, the antennas to send and receive wireless communications from other edge computing nodes in the edge computing network.

Example NODE2 includes the subject matter of Example NODE1, further comprising a system memory coupled to the one or more processors, the system memory to store instructions, the one or more processors to execute the instructions to perform the training.

Example NODE3 includes the subject matter of Example NODE1 or NODE 2, wherein the apparatus is the apparatus of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-IAG3, and the edge compute node further comprises: a network interface card (NIC) to provide the apparatus wired access to a core network; and a housing that encloses the apparatus, the transceiver, and the NIC.

Example NODE4 includes the subject matter of Example NODE3, wherein the housing further includes power circuitry to provide power to the apparatus.

Example NODE5 includes the subject matter of any one of Examples NODE3-NODE4, wherein the housing further includes mounting hardware to enable attachment of the housing to another structure.

Example NODE6 includes the subject matter of any one of Examples NODE3-NODE5, wherein the housing further includes at least one input device.

Example NODE6 includes the subject matter of any one of Examples NODE3-NODE6, wherein the housing further includes at least one output device.

An example implementation is an edge computing system, including respective edge processing devices and nodes to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is a client endpoint node, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is an aggregation node, network hub node, gateway node, or core data processing node, within or coupled to an edge computing system, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is an access point, base station, road-side unit, street-side unit, or on-premise unit, within or coupled to an edge computing system, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is an edge provisioning node, service orchestration node, application orchestration node, or multi-tenant management node, within or coupled to an edge computing system, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is an edge computing system operable as an edge mesh, as an edge mesh with side car loading, or with mesh-to-mesh communications, operable to invoke or perform the operations of Examples MA1-MA3, MA3.1-MA3.2, MA4, IMA1-IMA2, IMB1-IMB3, IMC1-IMC3, IMD1-IMD2, IME1-IME3, IMF1-IMF3, and IMG1-IMG3, or other subject matter described herein.

Another example implementation is the apparatus of any one of Examples AA1-AA3, AA3.1-AA3.2, AA4, IAA1-IAA2, IAB1-IAB3, IAC1-IAC3, IAD1-IAD2, IAE1-IAE3, IAF1-IAF3, and IAG1-IAG3 further including a transceiver coupled to the one or more processors, and one or more antennas coupled to the transceiver, the antennas to send wireless communications to and to receive wireless communications from other edge computing nodes in the edge computing network.

Another example includes an apparatus substantially as shown and described herein.

Another example includes a method substantially as shown and described herein.

Another example implementation is the apparatus of the Example of the paragraph above, further including a system memory coupled to the one or more processors, the system memory to store instructions, the one or more processors to execute the instructions to perform the training.

Another example implementation is an edge computing system including aspects of network functions, acceleration functions, acceleration hardware, storage hardware, or computation hardware resources, operable to invoke or perform the use cases discussed herein, with use of the examples herein, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples herein, or other subject matter described herein.

Another example implementation is an edge computing system adapted for mobile wireless communications, including configurations according to an 3GPP 4G/LTE or 5G network capabilities, operable to invoke or perform the use cases discussed herein, with use of the Examples above, or other subject matter described herein.

Any of the above-described Examples may be combined with any other example (or combination of examples), unless explicitly stated otherwise. Aspects described herein can also implement a hierarchical application of the scheme for example, by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Some of the features in the present disclosure are defined for network elements (or network equipment) such as Access Points (APs), eNBs, gNBs, core network elements (or network functions), application servers, application functions, etc. Any embodiment discussed herein as being performed by a network element may additionally or alternatively be performed by a UE, or the UE may take the role of the network element (e.g., some or all features defined for network equipment may be implemented by a UE).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An apparatus of an edge computing node to be operated in an edge computing network, the apparatus including:
    an interconnect interface to connect the apparatus to one or more components of the edge computing node; and
    one or more processors to:
        decode messages from a plurality of clients within the edge computing network, the messages including respective coded data for respective ones of the plurality of clients;
        compute estimates of metrics related to a global model for federated learning using the coded data, the metrics including a gradient on the coded data;
        use the metrics to update the global model to generate an updated global model, wherein the one or more processors are to update the global model by calculating the gradient on the coded data based on a linear fit of the global model to estimated labels from the federated learning; and
        send a message including the updated global model for transmission to at least some of the clients.

2. The apparatus of claim 1, wherein the coded data includes raw data that is encoded using a randomized orthonormal system (ROS) matrix.

3. The apparatus of claim 2, wherein the ROS matrix includes a Gaussian random matrix.

4. The apparatus of claim 2, wherein the coded data includes the raw data encoded using the ROS matrix, plus an additive noise parameter that corresponds to a zero mean noise.

5. The apparatus of claim 1, wherein computing the estimates of metrics includes estimating, for individual ones i of at least some of the clients, a gradient on associated coded data i based on an inverse of a number of coded observations that correspond to the associated coded data i, and further based on a transposition of a matrix of the associated coded data i.

6. The apparatus of claim 1, the one or more processors to further to select clients from the plurality of clients for a subsequent round of federated learning based on respective norms of respective local gradients of coded data sent to the apparatus by respective ones of the plurality of clients, the one or more processors to select the clients with norms of their respective local gradients that are above a threshold.

7. The apparatus of claim 1, wherein, for labels resulting from federated learning performed on the coded data that correspond to respective one-hot vectors, the one or more processors are to further cluster the clients for a subsequent round of the federated learning based on diagonal entries of an estimate of a probability density function (PDF) matrix for each label $\tilde{y}_i$, the PDF matrix corresponding to $$\frac{1}{c_i}\tilde{y}_i^T \tilde{y}_i,$$

where ci is a number of coded observations corresponding to coded data from client i, $\tilde{y}_i$ is a label matrix resulting from federated learning performed on the coded data from client i, and $\tilde{y}_i^T$ is a transposed form of $\tilde{y}_i$.

8. The apparatus of claim 1, the one or more processors to use the diagonal entries of the PDF matrix to determine an estimate of a probability mass function (PMF) for coded data from individual clients i, and to cluster the clients based on the PMF.

9. The apparatus of claim 8, where the PMF for coded data from individual clients i corresponds to at least one of a PMF of coded training data at the individual clients i, or a PMF of labels corresponding to the coded training data at the individual clients i.

10. The apparatus of claim 1, wherein the one or more processors are to estimate a principal component of a covariance matrix based on the coded data.

11. The apparatus of claim 10, wherein the one or more processors are to determine an approximation of the second order statistics of the coded data to estimate the principal component of the covariance matrix.

12. The apparatus of claim 11, wherein the approximation of the second order statistics is to be based on at least one of:
    coded training data at the individual clients i; or
    labels corresponding to the coded training data at the individual clients i.

13. The apparatus of claim 1, wherein the one or more processors are to determine an approximation of a training loss per client i using the coded data, wherein the one or more processors are to determine the approximation based on an inverse of a number of coded observations that correspond to the associated coded data i, and further based on a squared error cost function for client i of the global model, where the squared error cost function is in turn based on the coded data.

14. The apparatus of claim 1, further comprising:
    a transceiver coupled to the one or more processors;
    or more antennas coupled to the transceiver, the antennas to send and receive wireless communications from other edge computing nodes in the edge computing network;
    a system memory coupled to the one or more processors, the system memory to store instructions, the one or more processors to execute the instructions to perform the federated learning;
    a network interface card (NIC) to provide the apparatus wired access to a core network; a
    a housing that encloses the apparatus, the transceiver, and the NIC, wherein the housing further includes power circuitry to provide power to the apparatus.

15. A method to be performed at an apparatus of an edge computing node of an edge computing network, the method including:
    decoding messages from a plurality of clients within the edge computing network, the messages including respective coded data for respective ones of the plurality of clients;
    computing estimates of metrics related to a global model for federated learning using the coded data, the metrics including a gradient on the coded data;
    using the metrics to update the global model to generate an updated global model, wherein the edge computing node is to update the global model by calculating the gradient on the coded data based on a linear fit of the global model to estimated labels from the federated learning; and
    sending a message including the updated global model for transmission to at least some of the clients.

16. The method of claim 15, wherein the coded data includes raw data that is encoded using a randomized orthonormal system (ROS) matrix, the ROS matrix including a Gaussian random matrix.

17. The method of claim 16, wherein the coded data includes the raw data encoded using the ROS matrix, plus an additive noise parameter that corresponds to a zero mean noise.

18. The method of claim 15, the method further including, for each training round, selecting a corresponding client for the federated learning based on reducing an upper bound on an estimation error of a gradient relating to the coded data, wherein the upper bound is based on a normed difference of approximated gradients of coded data as between pairs of clients i and j given a current global model.

19. The method of claim 18, wherein, for an individual client i, an approximated gradient is based on an inverse of a number of coded observations that correspond to associated coded data i, and further based on a squared error cost function for client i of the global model, where the squared error cost function is in turn based on the coded data.

20. The method of claim 15, the method further including training an initial model on the coded data in order to optimize hyper parameters of the federated learning, the hyper parameters including at least one of: learning rate and momentum, depth or size of the model, hyper parameters for mapping raw data from the clients to another feature space, or a subset of clients to choose when implementing client selection on a coded federated learning framework.

21. One or more computer readable storage media comprising instructions, wherein execution of the instructions by processor circuitry is to cause the processor circuitry to:
decode messages from a plurality of clients within an edge computing network, the messages including respective coded data for respective ones of the plurality of clients;
compute estimates of metrics related to a global model for federated learning using the coded data, the metrics including a gradient on the coded data;
use the metrics to update the global model to generate an updated global model, wherein the processor circuitry is to update the global model by calculating the gradient on the coded data based on a linear fit of the global model to estimated labels from the federated learning; and
send a message including the updated global model for transmission to at least some of the clients.

22. The one or more computer readable storage media of claim 21, wherein the coded data includes raw data that is encoded using a randomized orthonormal system (ROS) matrix.

23. The one or more computer readable storage media of claim 21, wherein execution of the instructions is further to cause the one or more processors circuitry to, for each training round, select a corresponding client for the federated learning based on reducing an upper bound on an estimation error of a gradient relating to the coded data, wherein the upper bound is based on a normed difference of approximated gradients of coded data as between pairs of clients i and j given a current global model.

24. The one or more computer readable storage media of claim 23, wherein, for an individual client i, an approximated gradient is based on an inverse of a number of coded observations that correspond to associated coded data i, and further based on a squared error cost function for client i of the global model, where the squared error cost function is in turn based on the coded data.

25. The one or more computer readable storage media of claim 21, wherein execution of the instructions is further to cause the one or more processors circuitry to train an initial model on the coded data in order to optimize hyper parameters of the federated learning, the hyper parameters including at least one of: learning rate and momentum, depth or size of the model, hyper parameters for mapping raw data from the clients to another feature space, or a subset of clients to choose when implementing client selection on a coded federated learning framework.

* * * * *